(12) United States Patent
Sreenivasa et al.

(10) Patent No.: US 12,707,029 B1
(45) Date of Patent: Aug. 11, 2026

(54) VIDEO COMPRESSION USING REGION OF INTEREST OF MOVING OBJECTS

(71) Applicant: Amazon Technologies, Inc., Seattle, WA (US)

(72) Inventors: Pramod Sreenivasa, Snoqualmie, WA (US); Raj Kumar Akella, Bengaluru (IN); Ali Rahimi, Berkeley, CA (US); Maciej Adam Jakuc, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 18/618,359

(22) Filed: Mar. 27, 2024

(51) Int. Cl.

| | |
|---|---|
| ***H04N 7/18*** | (2006.01) |
| ***G06V 10/25*** | (2022.01) |
| ***G06V 10/82*** | (2022.01) |
| ***G06V 20/52*** | (2022.01) |
| ***G06V 40/16*** | (2022.01) |
| ***G06V 40/20*** | (2022.01) |
| ***H04N 19/137*** | (2014.01) |
| ***H04N 19/164*** | (2014.01) |

(52) U.S. Cl.
CPC ............. *H04N 7/183* (2013.01); *G06V 10/25* (2022.01); *G06V 10/82* (2022.01); *G06V 20/52* (2022.01); *G06V 40/161* (2022.01); *G06V 40/28* (2022.01); *H04N 19/137* (2014.11); *H04N 19/164* (2014.11)

(58) Field of Classification Search
None
See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — James M Anderson, II
(74) *Attorney, Agent, or Firm* — Athorus, PLLC

(57) ABSTRACT

Described are systems and processes for compressing image data, such as video data, based on detection of region of interests (ROIs) in the image data. Image data may be analyzed to determine moving objects and stationary objects (e.g., background) depicted in the image data. To compress the image data, the stationary objects are refreshed less frequently than moving objects. ROIs are identified in the moving objects, such as a face of a person, hands of a person, and/or objects moved by the person. Some of these ROI regions/pixels are maintained at high quality, while non-ROI regions/pixels are reduced in quality to further compress the image data. Faces are reduced in quality to obfuscate a person's identity. Multiple ROI regions may be located and then tracked simultaneously. The resulting compression may reduce storage space to store the image data and/or may reduce bandwidth needed to transmit the image data to remote devices while maintaining high quality in ROI regions.

20 Claims, 14 Drawing Sheets

(56) References Cited

U.S. PATENT DOCUMENTS

| | | | | |
|---|---|---|---|---|
| 8,175,925 | B1 | 5/2012 | Rouaix | |
| 8,189,855 | B2 | 5/2012 | Opalach et al. | |
| 8,423,431 | B1 | 4/2013 | Rouaix et al. | |
| 8,630,924 | B2 | 1/2014 | Groenevelt et al. | |
| 8,688,598 | B1 | 4/2014 | Shakes et al. | |
| 9,473,747 | B2 | 10/2016 | Kobres et al. | |
| 10,187,607 | B1 * | 1/2019 | Delachanal | H04N 23/951 |
| 2002/0080878 | A1 * | 6/2002 | Li | H04N 19/34<br>375/E7.092 |
| 2003/0002712 | A1 | 1/2003 | Steenburgh et al. | |
| 2004/0181467 | A1 | 9/2004 | Raiyani et al. | |
| 2008/0055087 | A1 | 3/2008 | Horii et al. | |
| 2008/0077511 | A1 | 3/2008 | Zimmerman | |
| 2008/0109114 | A1 | 5/2008 | Orita et al. | |
| 2009/0121017 | A1 | 5/2009 | Cato et al. | |
| 2009/0245573 | A1 | 10/2009 | Saptharishi et al. | |
| 2011/0011936 | A1 | 1/2011 | Morandi et al. | |
| 2012/0284132 | A1 | 11/2012 | Kim et al. | |
| 2013/0076898 | A1 | 3/2013 | Philippe et al. | |
| 2013/0253700 | A1 | 9/2013 | Carson et al. | |
| 2014/0279294 | A1 | 9/2014 | Field-Darragh et al. | |
| 2015/0019391 | A1 | 1/2015 | Kumar et al. | |
| 2015/0073907 | A1 | 3/2015 | Purves et al. | |
| 2016/0182866 | A1 * | 6/2016 | Landqvist | H04N 23/60<br>348/143 |
| 2020/0043181 | A1 * | 2/2020 | Kawai | G06V 20/41 |
| 2021/0103776 | A1 * | 4/2021 | Jiang | G06T 19/20 |
| 2021/0266570 | A1 * | 8/2021 | Wu | H04N 19/147 |
| 2023/0007276 | A1 * | 1/2023 | Adzic | H04N 19/167 |
| 2024/0121406 | A1 * | 4/2024 | Fitzgerald | H04N 19/164 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner 460
402
404
406
410
408
408A
430

500
INVENTORY DATA STORE 510
ITEM DATA STORE 504
USER DATA STORE 506
FACILITY DATA STORE 508
MACHINE LEARNING MODEL 512
NETWORK 502
MANAGEMENT SYSTEM 150
EXTERNAL SOURCE 514

VIDEO COMPRESSION USING REGION OF INTEREST OF MOVING OBJECTS

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Some entities use cameras to capture image data to track actions performed in an environment. These cameras can generate vast amounts of image data. Some cameras can be configured to output lower resolution image data to reduce storage space needed to store the image data or to reduce bandwidth needed to send the image data to another device through a network connection. However, low resolution image data may be undesirable by viewers and may not include important details desired by a recipient of the image data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
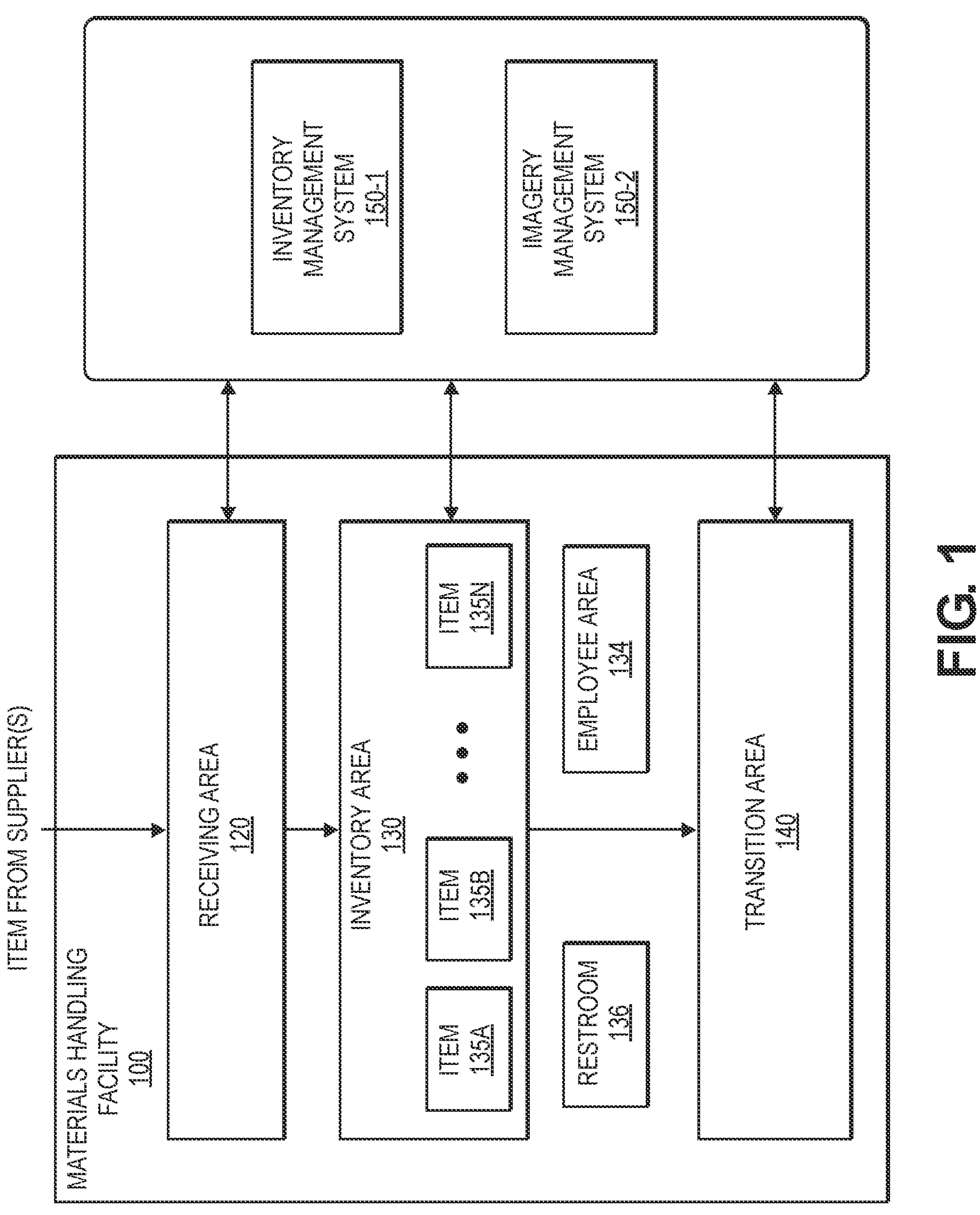
FIG. 1 is a block diagram illustrating a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a camera system and process for compressing video based on identification of one or more region of interest (or "ROI"). Image data may be captured by one or more cameras used to record actions performed in a specific area, such as at a materials handling facility. In some instances, it may be desirable to compress the image data while maintaining some high quality imagery in at least a portion of the image data, such as to enable a person or a machine to identify an object (e.g., read text on a label, etc.) or identify a person or part of a person (e.g., a hand touching an object, etc.). For example, the image data may be captured, compressed using the techniques discussed herein, and then transmitted via a network to another device for further analysis or for storage. It may be desirable to compress the image data to reduce network bandwidth needed to transport the image data or to reduce memory required to store the image data.

In accordance with various embodiments, image data may be received from a camera or multiple cameras and analyzed to differentiate between moving objects and stationary objects. The analysis may use a vision model to determine pixels that are moving and pixels that are stationary between frames in the image data. The stationary objects may be assumed to be background imagery and may be processed accordingly as discussed below. For example, when the camera has a field of view of a shelf of products in a retail store, the moving objects may include a person near the shelf, apparatus moved by the user (e.g., tote, bag, shopping cart, basket, etc.), and/or objects touched by the user. The stationary objects may be the shelves, the objects on the shelves, and other non-moving objects or fixtures in the field of view of the camera.

To compress the video, the stationary objects (background) may be preprocessed using a lower (slower) frame rate than a frame rate used for the moving objects. For example, the frame rate used for moving objects may be 30 frames per second while the frame rate for stationary objects may be less than 1 frame per second. However, other frame rate values may be used when preprocessing the stationary objects and moving objects. While the preprocessing may use different frame rates for the stationary objects and the moving objects, the encoding may use a single frame rate, such as the highest frame rate. During encoding of the stationary objects at a lower frame rate, same imagery may be used repeatedly across some consecutive frames to accommodate the difference in frame rates of sources (e.g., if the stationary frame rate is one per second, and frame rate of moving images is 15 frames per second, then the encoder may use a same image of the stationary imagery for 15 times until a new stationary imagery is provided by the encoder while each of the 15 frames may show differences, such as movement, of the moving objects).

In some embodiments, regions (or pixels) associated with moving objects may be analyzed to identify one or more ROI in the moving objects. For example, an ROI may be part of a person (e.g., hands, face, other appendage, etc.), an object, text or other numeric and/or non-numeric characters, visual codes, or other desirable imagery. In various embodiments, the selection of the ROI may be performed by a machine learning model, such as a deep neural network, trained to learn, discover, and/or detect ROIs. The ROI may include imagery that is important to preserve at a high quality for inspection by a person or machine during further analysis. For example, image data may depict a person touching an object on a shelf and then placing the object into a cart. During analysis of the image data, the person, the object, and the cart may be identified as moving objects. In this example, the person's hand that touches the object may be identified as a first ROI. The object that is adjacent to the hand and ultimately touched by the person may be identified as a second ROI. In some embodiments, multiple ROIs may be identified and tracked, possibly simultaneously, in the image data. Over time, the ROIs tracked in frames of image data may change (e.g., a system may track different objects over time). Each ROI may be defined by a boundary or bounding box that encloses a region (or pixels) included in the ROI. In some instances, metadata may be associated with an ROI, such as textual information, a name, a time, a descriptor, a product identifier, or other information. In various embodiments, some ROIs, such as faces of people, may be identified and are reduced in quality to obfuscate a person's identity or conceal other sensitive information.

During compression of the video image, some ROIs (e.g., regions or pixels) may be maintained at high quality, while non-ROI regions/pixels that are part of the moving objects may be reduced in quality to further compress the video. In the example above, the torso, arms, and legs of the person and the cart may be considered non-ROI, which may also be referred to as regions of disinterest (or "ROD").

In accordance with some embodiments, a system may use a fusion of (1) deep neural network processing for human segmentation (i.e., ROI selection), (2) computer vision algorithms for pre-processing background (i.e., detection of stationary objects), and (3) video transcoding of the ROIs determined by the deep neural network selection and the processed background to create the compressed image data that retains desirable objects at a high quality for later inspection or processing. The resulting compression may reduce bandwidth by greater than 4×, and possibly greater than 12× compared to existing compression algorithms while allowing a viewer or image processing software to still receive high quality video of important parts of the video, such as to support a checkout-free shopping environment and/or to monitor activities in a materials handling facility. The compressed image data may require significantly less bandwidth to send to an external device and may require less memory to store the data as compared to the raw (uncompressed) image data created by the cameras.

The image data, or video data, may be any format or type of image data that depicts a scene over a period of time. The image data may be captured by one or more cameras or other types of imaging devices. The image data may be comprised of pixels that depict the imagery and may be segmented into frames which show the scene at a moment in time. Consecutive frames may be analyzed to determine movement of pixels between frames, for example.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, one or more transition areas 140, one or more restrooms 136, and one or more employee areas 134 or break-rooms. The arrangement of the various areas within the materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150-1 configured to interact with each of receiving area 120, inventory area 130, transition area 140 and/or users within the materials handling facility 100. Likewise, the materials handling facility includes an imagery management system 150-2 configured to interact with image capture devices at each of the receiving area 120, inventory area 130, and/or transition area 140 and process image data to track users and/or items as they move throughout the materials handling facility 100, among other functions.

The materials handling facility 100 may be configured to receive different kinds of inventory items 135 from various suppliers and to store them until a user orders or retrieves one or more of the items. The general flow of items through the materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged and the inventory management system (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130 on an inventory shelf. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from the inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances, an item may be picked from its inventory location, moved a distance and placed at another location.

As discussed further below, as the user moves through the materials handling facility, images of the user and/or portions of the facility may be obtained by imaging devices (e.g., cameras) deployed in the facility. The images (or video) may be stored as image data and used for various purposes, such as to track actions performed by the users, track movement or inventory of items, track items acquired by customers, and so forth. The image data may be processed as discussed further below to compress the image data while retaining some higher quality information in the image data, which may be used for the purposes described herein.

Figure 2:
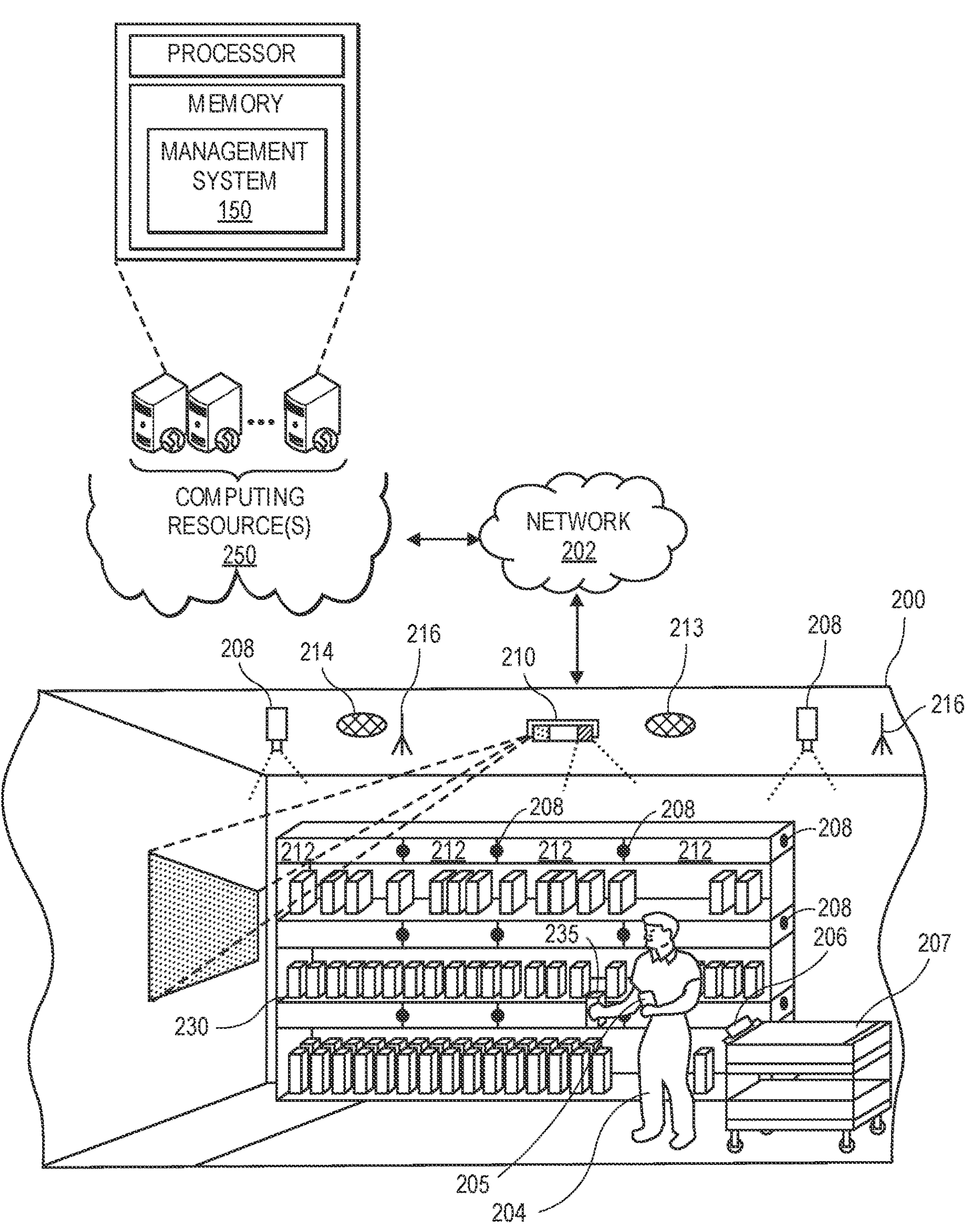
FIG. 2 shows additional components of the materials handling facility of FIG. 1, according to an implementation.

FIG. 2 shows additional components of a materials handling facility 200, according to one implementation. Generally, the materials handling facility 200 may include one or more image capture devices 208, such as cameras. For example, one or more image capture devices 208 may be positioned in locations of the materials handling facility 200 so that images of locations, items, and/or users within the materials handling facility can be captured. In some implementations, the image capture devices 208 may be positioned overhead, such as on the ceiling or above a shelf, and oriented toward a surface (e.g., floor) or shelf of the material handling facility. In some instances, the image capture devices 208 may be oriented so that the image capture devices 208 are approximately perpendicular with the surface and the field of view is oriented toward the surface. The image capture devices 208 may then be used to capture images of users and/or objects within the materials handling facility from an overhead view. In addition, in some implementations, one or more image capture devices 208 may be positioned on or inside of inventory areas. For example, a series of cameras may be positioned on external portions of the inventory areas and positioned to capture images of users and/or the location surrounding the inventory area.

Any type of camera and/or configuration of cameras may be used with the implementations described herein. For example, one or more of the cameras may be a red, green, blue ("RGB") color camera, still camera, motion capture/video camera, etc. In other implementations, one or more of the cameras may be depth sensing cameras, also referred to herein as a RGBD camera. In still other implementations, one or more of the cameras may be a thermographic or infrared (IR) camera, etc. In some implementations, the cameras may simply be camera modules that include a lens and an image sensor. The image sensor may convert an optical image obtained by the lens of the camera into a digital signal or digital representation of the image (generally referred to herein as image data). In one implementation, the image sensor may be a RGB sensor capable of supporting an image resolution of at least 640×480 at six frames per second. The image sensor may likewise be configured to provide the image data to other components (e.g., a graphics processing unit) for processing and/or other systems, such as the imagery management system 150-2. In some implementations, cameras may be paired to provide stereo imagery and depth values indicating a distance between the camera and an object being imaged. A stereo camera may include a pair of camera modules. Image data may be stored in any variety of formats including, but not limited to, YUYV, RGB, RAW, HEX, HSV, HLS, CMYK, bmp, jpeg, etc.

Cameras operate by electronically capturing reflected light from objects and assigning quantitative values to one or more aspects of the reflected light, such as pixels. A camera may include one or more sensors having one or more filters associated therewith. The sensors of a camera may capture information regarding any number of pixels of the reflected light corresponding to one or more base colors (e.g., red, green or blue) expressed in the reflected light, and store values associated with the pixel colors as image data and/or transmit image data to another device for further analysis or reproduction. The camera may also be configured to determine depth values, such as the distance between the camera and an object in the field of view of the camera. Depth values may be included in the image data generated by the camera.

Information and/or data regarding features or objects represented in a digital image may be extracted from the image in any number of ways. For example, a color of a pixel or a group of pixels in image data may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of an image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

In addition to cameras, other input devices, such as pressure sensors, infrared sensors, scales, light curtains, load cells, radio frequency identification (or "RFID") readers, etc., may be utilized with the implementations described herein. For example, a pressure sensor and/or a scale may be used to detect the presence or absence of items and/or to determine when an item is added and/or removed from inventory areas. Likewise, a light curtain may be virtually positioned to cover the front of an inventory area and detect when an object (e.g., a user's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When a user 204 arrives at the materials handling facility 200, one or more images of the user 204 and/or of items may be captured and processed. The user 204 may use a tote 207, which includes an identifier 206. Images of the user 204 and/or tote 207 may be processed to identify the user, the tote, the identifier of the tote, an item touched by the user, and so forth. As discussed below, the image data may be captured, and then processed to compress the image data while retaining high quality imagery for portions of a scene to enable tracking of ROIs, which may include hands of a person, objects touched by the hands or adjacent to the hands, and so forth.

Returning to FIG. 2, in some implementations, a user located in the materials handling facility 200 may possess a portable device 205 and obtain information about items located within the materials handling facility 200, receive confirmation that the inventory management system has correctly identified items that are picked and/or placed by the user, receive requests for confirmation regarding one or more event aspects, etc. Generally, the portable device has at least a wireless module to facilitate communication with a management system 150 (e.g., the inventory management system) and a display (e.g., a touch-based display) to facilitate visible presentation to and interaction with the user. The portable device may store a unique identifier and provide that unique identifier to the management system 150 and be used to identify the user. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management system 150. Likewise, components of the management system 150 may interact and communicate with the portable device as well as identify the user, communicate with the user via other means and/or communicate with other components of the management system 150.

Generally, the management system 150 may include one or more input/output devices, such as imaging devices (e.g., cameras) 208, projectors 210, displays 212, speakers 213, microphones 214, illumination elements (e.g., lights), etc., to facilitate communication between the management system 150 and/or the user and detection of items, events and/or other actions within the materials handling facility 200. In some implementations, multiple input/output devices may be distributed within the materials handling facility 200. For example, there may be multiple imaging devices, such as cameras located on the ceilings and/or cameras (such as pico-cameras) located in the aisles near the inventory items. In some embodiments, the imaging devices may output multiple sources of image data including a high resolution image data and a low resolution image data. However, some imaging devices may only output a single source of image data.

Likewise, the management system 150 may also include one or more communication devices, such as wireless antennas 216, which facilitate wireless communication (e.g., Wi-Fi, Near Field Communication (NFC), Bluetooth) between the management system 150 and other components or devices. The management system 150 may also include one or more computing resource(s) 250, such as a server system, that may be local to the environment (e.g., materials handling facility), remote from the environment, or any combination thereof.

The management system 150 may utilize antennas 216 within the materials handling facility 200 to create a network 202 (e.g., Wi-Fi) so that the components and devices can connect to and communicate with the management system 150. For example, when the user picks an item 235 from an inventory area 230, a camera of the multiple-camera apparatus 227 may detect the removal of the item and the management system 150 may receive information, such as image data of the performed action (item pick from the inventory area), identifying that an item has been picked from the inventory area 230. The event aspects (e.g., user identity, action performed, item involved in the event) may then be determined by the management system 150.

Figure 3:
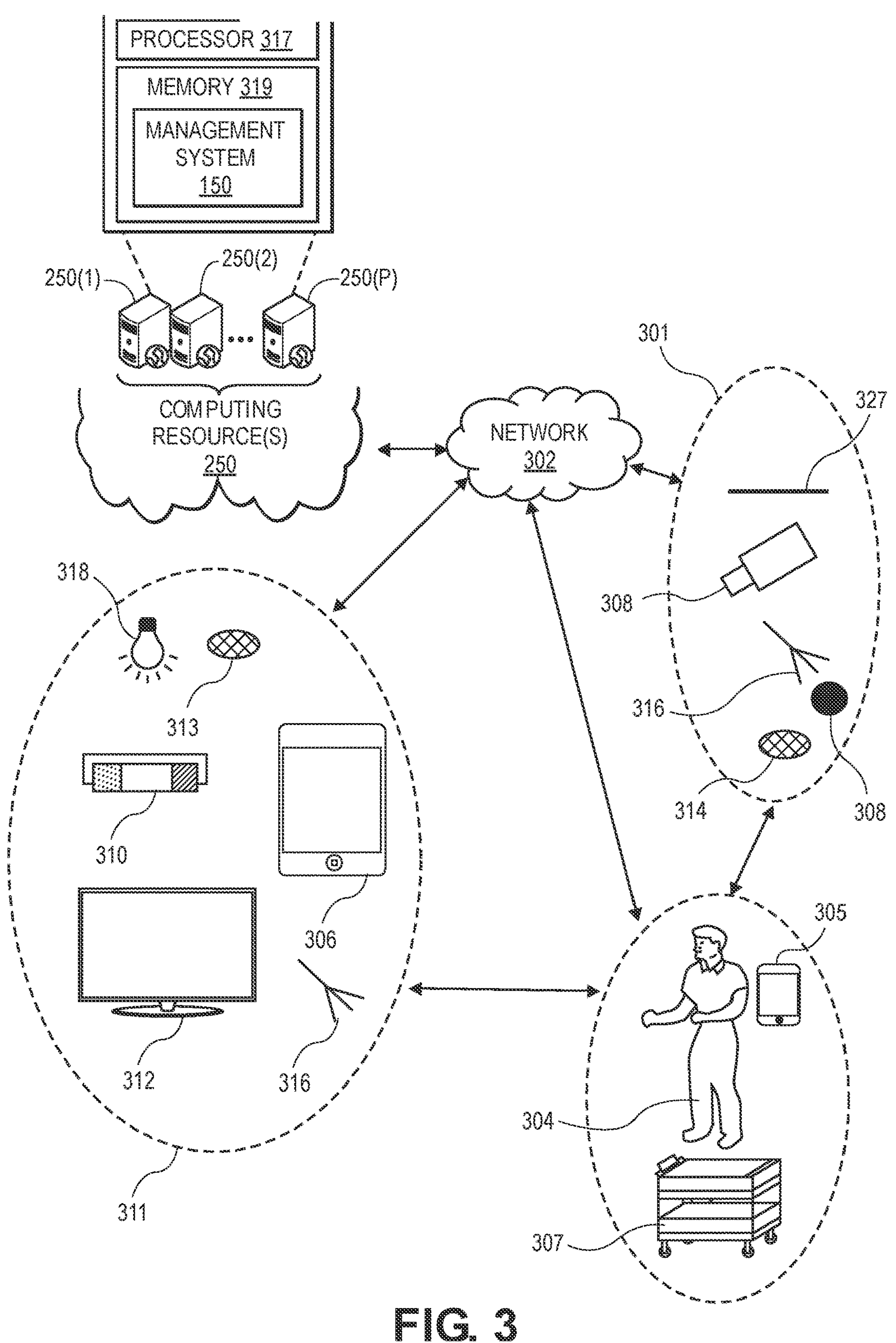
FIG. 3 shows components and communication paths between component types utilized in a materials handling facility of FIG. 1, according to an implementation.

FIG. 3 shows example components and communication paths between component types utilized in a materials handling facility 100, in accordance with one implementation. A portable device 305 may communicate and interact with various components of management system 150 over a variety of communication paths. Generally, the management system 150 may include input components 301, output components 311 and computing resource(s) 250. The input components 301 may include an imaging device 308, a multiple-camera apparatus 327, microphone 314, antenna 316, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The management system 150 may also include computing resource(s) 250. The computing resource(s) 250 may be local to the environment (e.g., materials handling facility), remote from the environment, or any combination thereof. Likewise, the computing resource(s) 250 may be configured to communicate over a network 302 with input components 301, output components 311 and/or directly with the portable device 305, a user 304 and/or the tote 307.

As illustrated, the computing resource(s) 250 may be remote from the environment and implemented as one or more servers 250(1), 250(2), . . . , 250(P) and may, in some instances, form a portion of a network-accessible computing platform implemented as a computing infrastructure of processors, storage, software, data access, and so forth that is maintained and accessible by components/devices of the management system 150 and/or the portable device 305 via a network 302, such as an intranet (e.g., local area network), the Internet, etc. The computer resource(s) 250 may process images of users to identify the user, process images of items to identify items, determine a location of items and/or determine a position of items. The computer resource(s) 250 does not require end-user knowledge of the physical location and configuration of the system that delivers the services.

Common expressions associated for these remote computing resource(s) 250 include "on-demand computing," "software as a service (SaaS)," "platform computing," "network-accessible platform," "cloud services," "data centers," and so forth.

Each of the servers 250(1)-(P) include a processor 317 and memory 319, which may store or otherwise have access to a management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., radio frequency, infrared, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
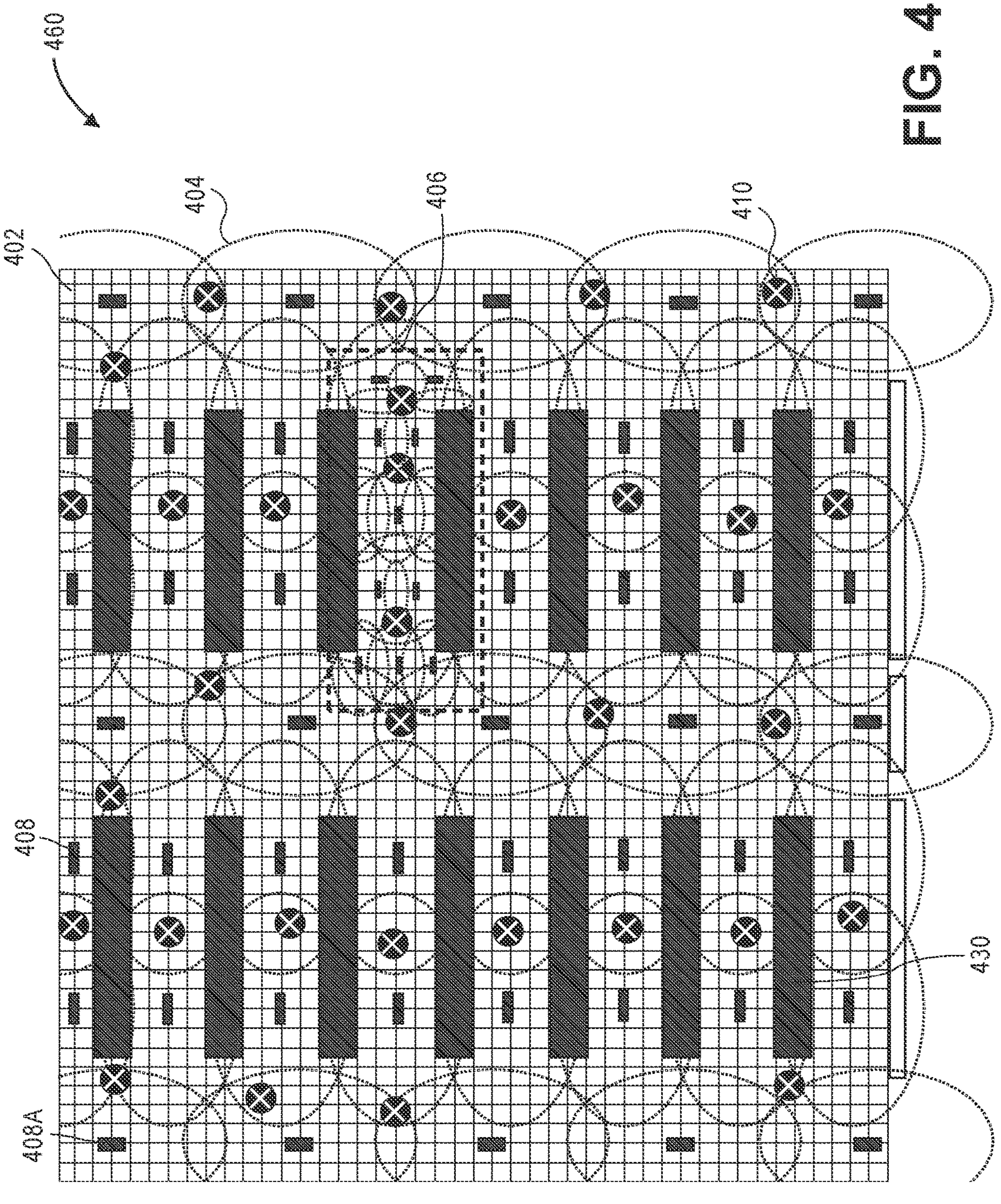
FIG. 4 is a block diagram of an overhead view of a cluster, according to an implementation.

FIG. 4 is a block diagram of an overhead view of a cluster 460, according to an implementation. A cluster may represent a segment of a materials handling facility 100. In some implementations, a single materials handling facility may include a plurality of clusters. In other implementations, a single cluster may be used to cover an entire materials handling facility.

Within each cluster 460, a plurality of cameras 408 may be positioned overhead (e.g., on a ceiling, at or near top of a shelf, etc.) at defined locations so that the collective field of view of the cameras covers the surface of the portion of the materials handling facility corresponding to the cluster 460. In some implementations, a grid 402 system, physical or virtual, is oriented with the shape of the materials handling facility (e.g., oriented with the walls of the materials handling facility). The grid 402 may be utilized to attach or mount cameras within the cluster 460 at defined locations with respect to the physical space of the materials handling facility. For example, in some implementations, the cameras may be positioned at any increment from other cameras along the grid.

By mounting the cameras overhead at defined locations along the grid, the cameras can be associated with physical coordinates within the materials handling facility. For example, if the cluster 460 represents the north-west corner of a materials handling facility, the grid 402 may be segmented into columns and rows and cameras may be positioned at any point on the grid. The columns and rows may be identified using any nomenclature, such as alphabetical characters for columns and numeric characters for rows. Each column/row intersection is at a defined physical location within the materials handling facility. For example, if the grid is positioned in one foot by one foot increments, the physical location within the materials handling facility of every grid intersection and any connected cameras is known. In this example, camera 408A is positioned at grid coordinate B:3, which corresponds to the horizontal coordinate of the camera being positioned approximately two feet by three feet from the origin (in this example the upper left corner) of the cluster.

Because the field of view 404 of the cameras 408 may not be circular, the cameras may be placed at defined directions (e.g., 0, 90, 180, 270 degrees). The direction of the camera may be determined based on the field of view 404 coverage of adjacent cameras and/or the layout of objects on the surface of the materials handling facility. For example, if the camera 408 is being mounted above an aisle between two inventory locations, the direction of the camera may be set so that the larger portion of the field of view 404 of the camera covers the length of the aisle.

The height of the cameras from the surface, the distance between camera placement and/or direction of the cameras 408 within the cluster 460 may vary depending on the layout of the materials handling facility, the lighting conditions in the cluster, the volume of users expected to pass through a portion of the cluster, the activities and/or volume of activities expected to occur at different locations within the cluster, etc. For example, cameras may typically be mounted horizontally every three to four feet in one direction and every four to five feet in another direction along the grid 402 so that the field of view of each camera overlaps, as illustrated in FIG. 4.

In some implementations, the height of the cameras from the surface and the distance between cameras may be set so that their fields of view intersect and begin to overlap approximately seven feet above the surface of the materials handling facility. Positioning the cameras so that the fields of view overlap at approximately seven feet will result in the majority of users being within a field of view of a camera at all times. If the field of view of the cameras did not overlap until they were approximately three feet above the surface, as a user moves between the fields of view, the portion of the user that is taller than approximately three feet would exit one field of view and not enter the next field of view until the user has moved into that range of the camera. As such, a portion of the user is not detectable as they transition between fields of view. Likewise, by overlapping the fields of view of multiple cameras, each of the overlapping cameras may capture images that include representations of the user from slightly different perspectives. This image data may be combined and utilized to develop a three dimensional, or partially three dimensional model, or user pattern, of the user.

While this example describes overlapping camera fields of view at approximately seven feet above the surface of the materials handling facility, in other implementations, the cameras may be positioned so that the fields of view begin to overlap at different heights (e.g., six feet, eight feet).

In some areas of the cluster, such as cluster area 406, cameras 408 may be positioned closer together and/or closer to the surface area, thereby reducing their field of view, increasing the amount of field of view overlap, and/or increasing the amount of coverage for the area. Increasing camera density may be desirable in areas where there is a high volume of activity (e.g., item picks, item places, user dwell time), high traffic areas, high value items, poor lighting conditions, etc. By increasing the amount of coverage, the image data increases, thereby increasing the likelihood that an activity or action will be properly determined.

In some implementations, one or more markers 410 may be positioned throughout the cluster and used to aid in alignment of the cameras 408. The markers 410 may be placed at any location within the cluster. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers 410 may be placed on the surface of the materials handling facility. In other implementations, the markers 410 may be placed on a visible surface of an inventory location 430 within the cluster. In still other implementations, the inventory location 430 itself may be utilized as a marker. Alternatively, or in addition thereto, one or more inventory items that are viewable by the cameras may be used as the marker 410. In still other examples, the surface of the materials handling facility may have a detectable pattern, marks, defects, etc., that can be determined and used as markers 410 to align cameras.

In some implementations, the markers 410 may be temporarily placed at locations within the materials handling facility and used to calibrate the cameras. During calibration, the cameras may be aligned with respect to one another by aligning the position of the markers 410 in each camera's field of view. Likewise, the field of view of each camera may be determined and associated with coordinates of the materials handling facility.

The cameras 408 of a cluster may obtain images (still images or video) and process those images to reduce the image data and/or provide the image data to other components. As discussed further below, image data for each image or frame may be reduced to only include pixel information for pixels that have been determined to have changed. For example, baseline image information may be maintained for a field of view of a camera corresponding to the static or expected view of the materials handling facility. Image data for an image may be compared to the baseline image information and the image data may be reduced by removing or subtracting out pixel information that is the same in the image data as the baseline image information. Image data reduction may be done by each camera. Alternatively, groups of cameras may be connected with a camera processor that processes image data from a group of cameras to reduce the image data of those cameras. In some embodiments, the camera 408 may generate at least two outputs: a high resolution image data and a low resolution image data. However, some cameras may only output a high resolution image data. The image data may be compressed using the techniques discussed below with reference to FIGS. 6-11 and using the systems described with reference to FIG. 5.

Figure 5:
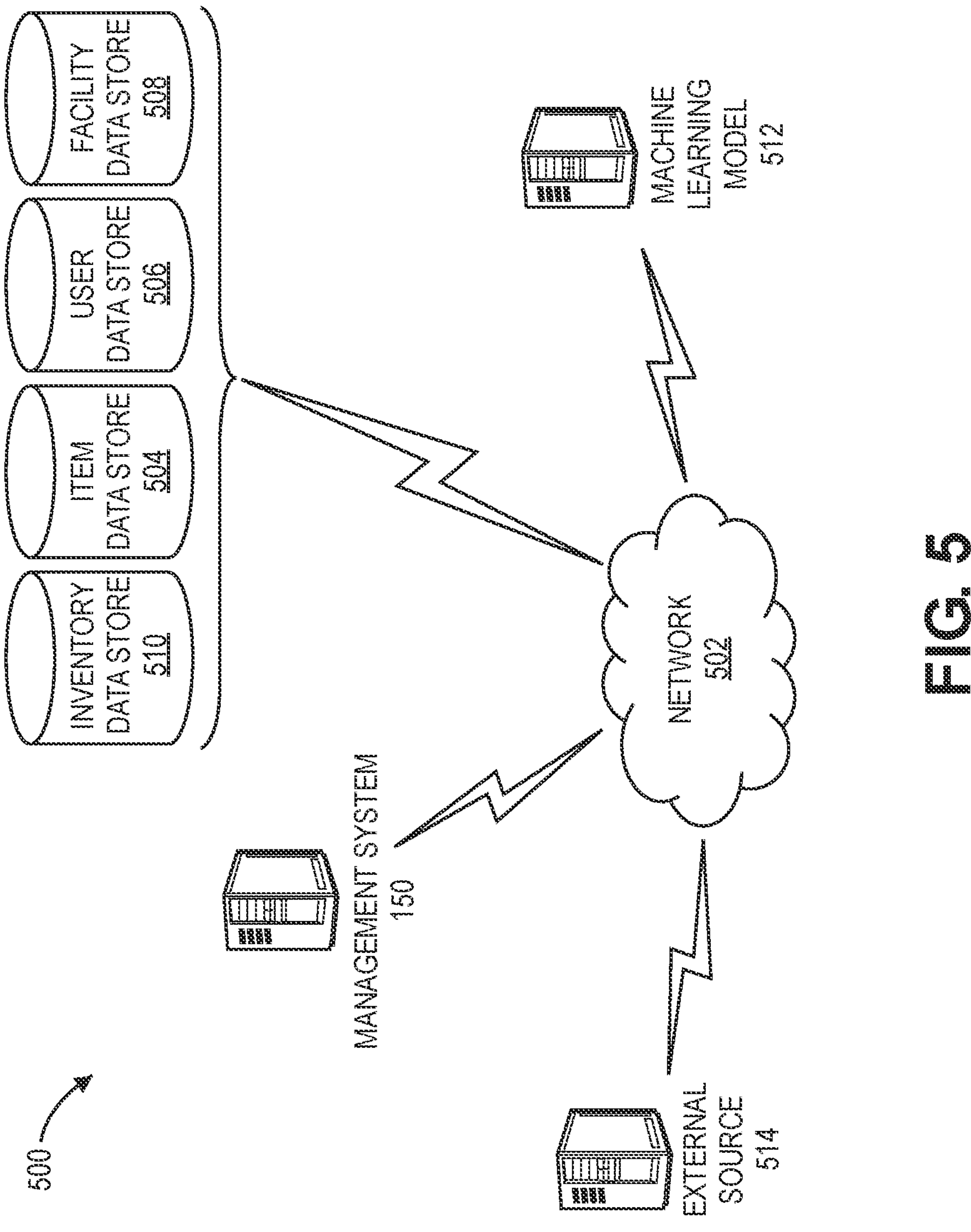
FIG. 5 is a block diagram of an illustrative computing environment to process imagery and compress video, according to an implementation.

FIG. 5 is a block diagram of an illustrative computing environment 500 configured to process imagery and compress video, according to an implementation. The computing environment 500 may include the management system 150, discussed above, connected to a network 502 such as an intranet (e.g., local area network), the Internet, etc. via wired and/or wireless communication. The management system 150 may be in communication with various data stores, which may include an item data store 504, a user data store 506, a facility data store 508, and an inventory data store 510. The management system 150 may also be in communication with other data stores or other data and/or other services. However, other arrangements of data may be used in the computing environment 500.

The item data store 504 may store information about items available in the materials handling facility. For example, the information may include unique identifiers for the items (e.g., bar code, universal product code (UPC), stock keeping unit (SKU), etc.), descriptions, names, and other product information. The information may include visual descriptors that enable algorithms to associate detected items in captured image data with the items from the item data store 504. In various embodiments, the item data store 504 may include item dimensions, item markings (e.g., colors, shapes, etc.), item location information, a price of the item, item associations (e.g., other items commonly associated with the item, etc.), and so forth. As an example, image data may include depiction of a user touching a cylindrical object that includes text. Analysis of the text and the object shape and object attributes may be compared to data in the item data store 504 to determine the exact item, a price of the item, and/or other information.

The user data store 506 may store information about users that may be located in the materials handling facility. For example, users may be registered or identified through an account or through other identifiers or attributes and may have some information stored in the user data store 506. The user data store 506 may include description information about the user to allow an algorithm to identify the user via analysis of image data. For example, the user may be identified by a visual tag carried or worn by the user while the user is located in the materials handling facility. The user data store 506 may also include a unique identifier of associated items such as an item list, prior purchases (or prior item associations), payment information, and/or other information about the user. Algorithms may use information from the user data store 506 to detect and/or label a user captured in image data, such as to associate an item with the user or for other purposes.

The facility data store 508 may store information about the materials handling facility. For example, the information may include physical layout information, item location within the materials handling facility, shelf configurations and items stocked on the shelves, locations of image capture devices, identifiers for the image capture devices and identifiers for the materials handling facility, and other information about the materials handling facility. The facility data store 508 may be used by algorithms to determine and/or identify objects viewable within image data captured at a particular materials handling facility. For example, a particular camera may have an identification associated with its outputted image data, this identification may be mapped via the facility data store 508 to items viewable by this camera.

The inventory data store 510 may store information about inventory of items available in the materials handling facility. For example, the inventory data store may be used to track an amount of items currently available within the facility and may be used to order additional items such as to replenish items purchased by users. As an example, image data may be analyzed to determine that a user removed an item from a shelf. The user may then be charged a fee if the user leaves the materials handling facility with the item. The inventory data store 510 may then be updated to reflect a new quantity available of the item taking into account that the user removed the item from the materials handling facility.

In accordance with some embodiments, the management system 150 may be in communication with a machine learning model 512 via the network 502. In some embodiments, the machine learning model may be a deep neural network. However, the machine learning model 512 may be implemented using other models such as a deep learning model, a clustering model, a regression model, or a Naïve Bayes classifier, for example.

As described in more detail below, the management system 150 may compress image data captured by the image capture devices. The image data may be processed at least partially by the machine learning model 512 that uses computer vision algorithms to identify one or more ROIs within the image data. The machine learning model 512 may be trained to identify and detect ROIs, such as by using feature recognition. For example, the machine learning model may perform human segmentation to determine humans or portions of humans (e.g., hands, faces, bodies, arms, etc.) within the image data. The machine learning model may also perform object segmentation (or object identification) to determine items (e.g., identify specific items, etc.) within the image data. The machine learning model 512 may be used to detect users/items using feature recognition, create bounding boxes or other boundaries or borders around the users/items to define pixels or regions, and/or to label the users/items with descriptors and/or other information for association with the users/items. As an example, the machine learning model 512 may analyze image data over a series of frames of images to identify a user's hand and an item adjacent to the user's hand using feature recognition. The user's hand may be identified as a first ROI and may include a first bounding box (or boundary) that defines first pixels included in the first ROI. Likewise, the item adjacent to the user's hand may be identified as a second ROI and may include a second bounding box (or border) that defines second pixels included in the second ROI. The first ROI may be associated with a user identity while the second ROI may be associated with an item identifier. This may allow association of the item with the user.

The management system 150 may also be in communication with an external source 514 via the network 502. The external source 514 may be a source that stores compressed image data after processing by the management system 150 using the techniques discussed below. In some embodiments, the external source 514 may analyze the compressed image data for various reasons such as to track item interaction within the materials handling facility.

Figure 6A:
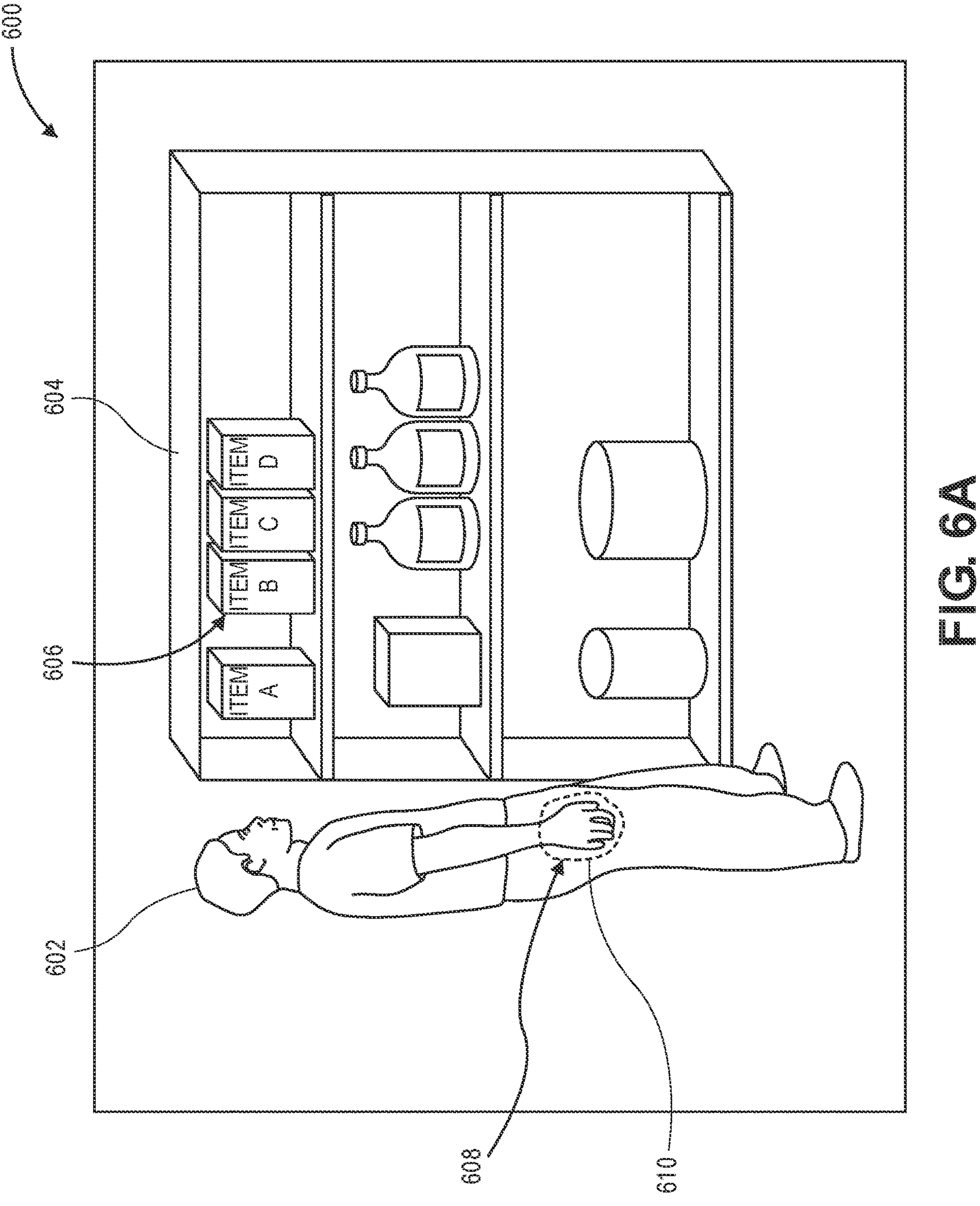
FIGS. 6A-6C are schematic diagrams of illustrative image processing including ROI identification, according to an implementation.
Figure 6B:
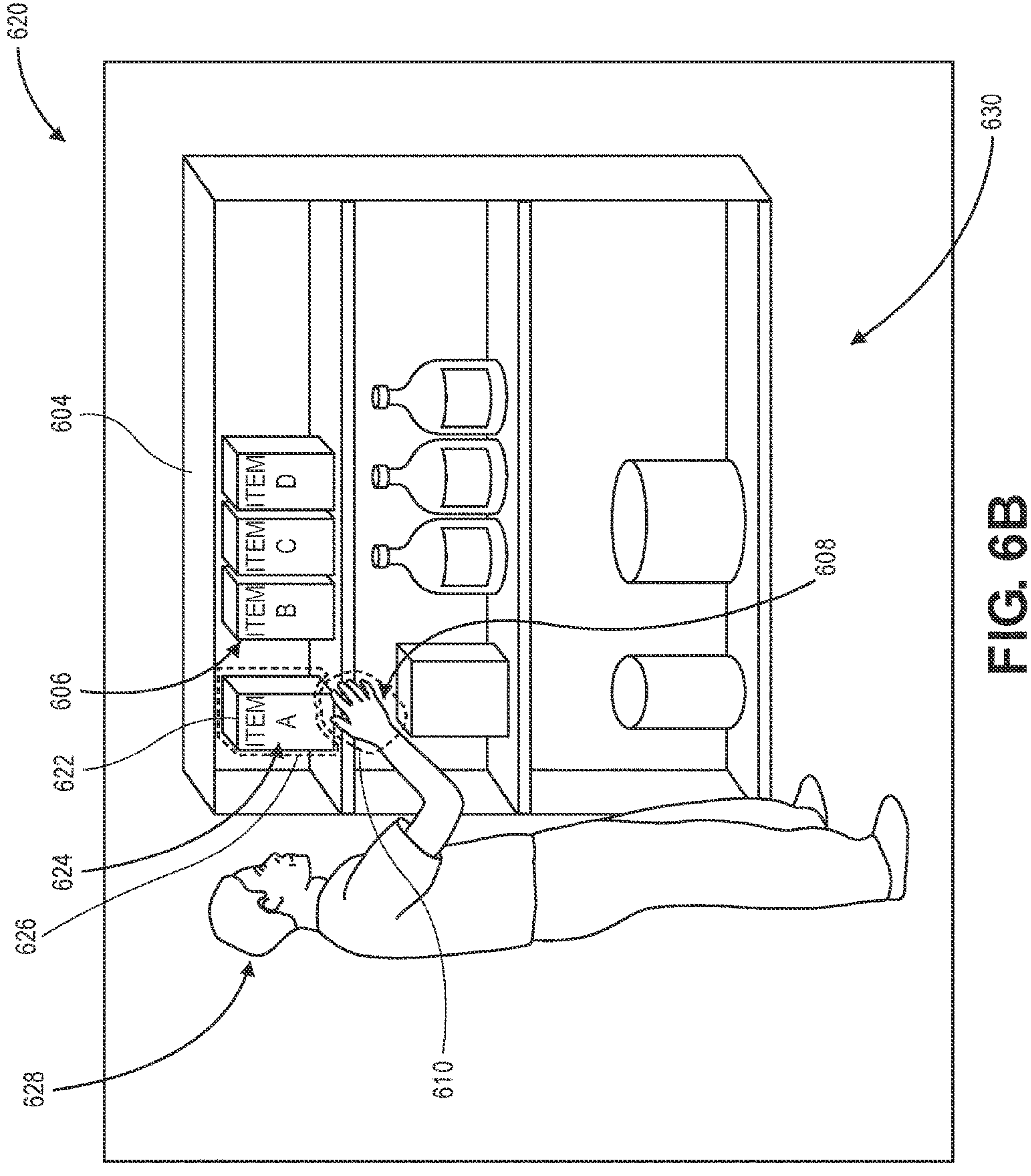
Figure 6C:
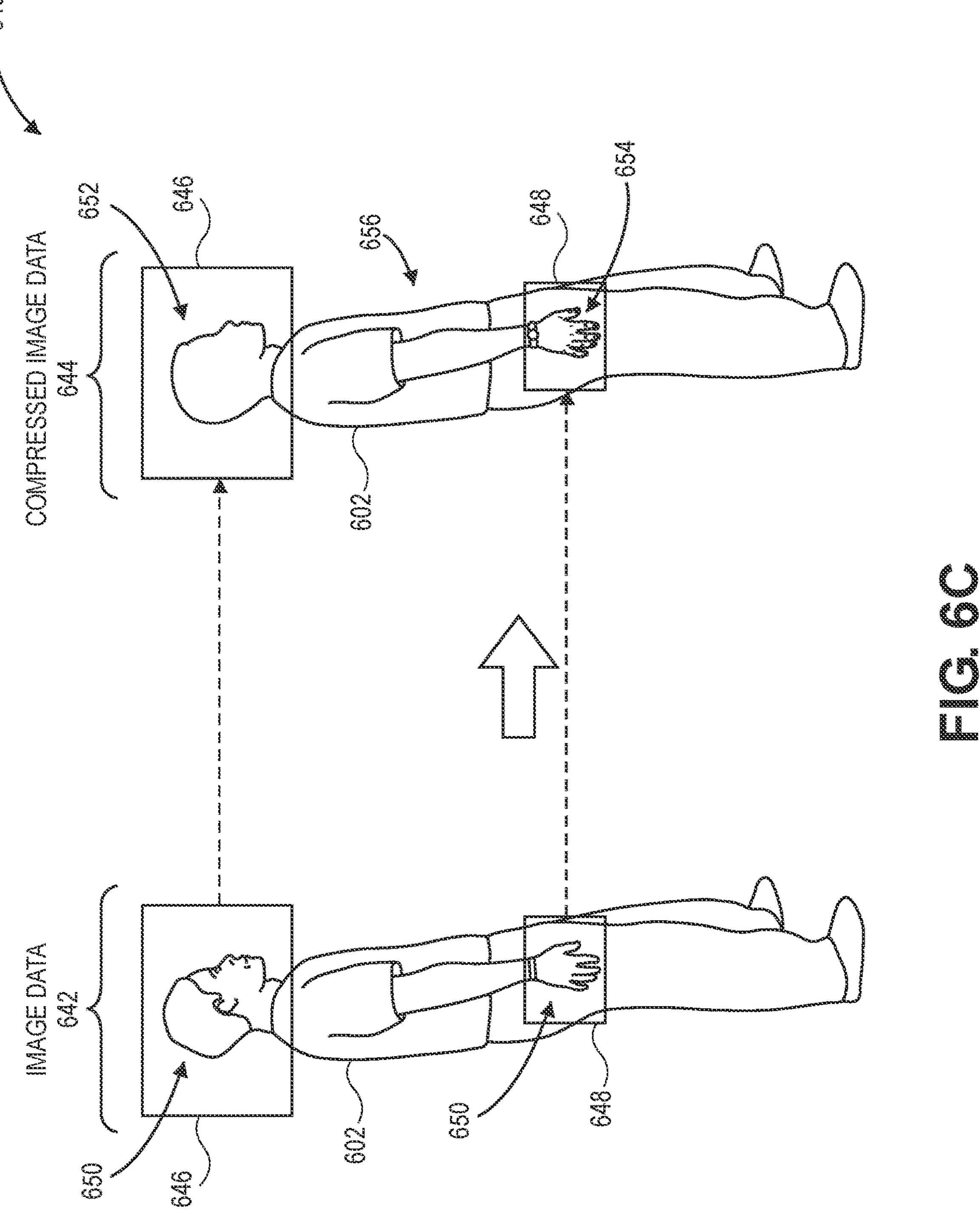

FIGS. 6A-6C are schematic diagrams of illustrative image processing including ROI identification, according to an implementation. Turning to FIG. 6A, an illustrative first image 600 (e.g., frame of a series of video images) depicts a user 602 standing near or next to a shelf 604 that includes various items 606. The first image 600 may be processed by the management system 150 and/or the machine learning model 512 to identify a first ROI 608. In this example, the first ROI 608 may be a hand of the user 602. The first ROI 608 may be defined as a region or group of pixels within a first boundary 610. The first boundary 610 may be determined, based in part on, processing by the machine learning model 512. For example, the first boundary 610 may be determined by edge detection of a known shape (e.g., a human hand, etc.). The first boundary 610 may be larger than a boundary of the detected object (e.g., hand) to create a buffer. The buffer may include pixels that may indicate other objects near the first ROI. The size of the buffer may be fixed or variable, such as based on a target compression rate or based on other ROIs in the image data as discussed further with reference to FIG. 11.

Turning to FIG. 6B, an illustrative second image 620 depicts the user 602 at a later time (e.g., subsequent frame of the video) as the user reaches for an item 622 (e.g., "Item A") on the shelf 604. The second image 620 may be processed by the management system 150 and/or the machine learning model 512 to identify a second ROI 624. In this example, the second ROI 624 may be the item 622 that is adjacent to the first ROI 608 (e.g., the user's hand). The second ROI 624 may be defined as a region or group of pixels within a second boundary 626 that is different than the first boundary 610. The second boundary 626 may be determined, based in part on, processing by the machine learning model 512. For example, the second boundary 626 may be determined by edge detection of a known shape (e.g., product packaging of the item 622, etc.). The first boundary 610 and the second boundary 626 may include different regions (e.g., not overlapping) and different pixels which are associated with the corresponding ROIs.

Additional ROIs may be identified in image data and tracked at a same time. Objects, such as people, may enter a field of view of a camera and be captured in the image data, then identified as ROIs. When the user leaves the field of view, the associated ROI May terminate. Other, new ROIs may be identified over time in the image data, such as in later frames of the image data when other users enter the field of view, interact with items, and so forth. Although this discussion includes items and hands indicated as ROIs, other objects may be defined as ROIs, possibly by the machine learning model 512, such as marking, codes, alphanumeric characters, devices, or other objects.

During further processing of image data that includes the first image 600 and the second image 620, the processing may use a vision module (e.g., algorithm) to determine pixels that move between frames to classify pixels (or regions) as associated with moving objects 628 and/or determine pixels that do not move between frames to classify pixels (or regions) as associated with stationary objects 630. As shown in FIG. 6B, the user 602 is moving to reach for the item 622. Analysis of this portion of image data (also using the first image 600 shown in FIG. 6A) may identify the user 602 as part of the moving objects 628. Additionally, after the user 602 grasps the object 622, the object may become part of the moving objects 628. Similarly, the processing of the image data may determine the stationary objects 630, such as the shelf 604, other items on the shelf (e.g., Item B, Item C, Item D, etc.), and other pixels (or regions) that are not classified as moving objects. The stationary objects 630 may be commonly referred to as background.

As discussed below with reference to FIGS. 7-11, the pixels or regions associated with the moving objects 628 may be analyzed as candidates for having ROIs. However, ROIs may be identified from the stationary objects 630 in some instances, such as the item 622 prior to being moved by the user in a subsequent frame. During compression of the image data that includes the first image 600 and the second image 620, the moving objects 628 may be refreshed at a first frame rate while the stationary objects 630 may be refreshed at a second frame rate that is lower (less frequent) than the first frame rate, thereby reducing a size of the compressed image data. For example, the second frame rate may be less than or equal to 1/30 of the first frame rate, less than or equal to 1/60 of the second frame rate, selected based on compression target size, a number of ROIs identified, and/or selected based on other information (e.g., available network bandwidth, storage specifications, etc.).

FIG. 6C shows a schematic diagram 640 representing image data 642 from an image capture device and compressed image data 644 after processing by the systems and processes described herein (e.g., the management system 150 and/or the machine learning model 512). The image data 642 may be a low resolution video captured by the image capture device that also captures a corresponding high resolution video. Analysis of the imagery may be performed on the low resolution video to expedite processing. The low resolution video may be analyzed to identify a first ROI 646, such as a face or head of the user 602 and to identify a second ROI 648, such as a hand of the user 602. More or fewer ROIs may be identified based on the application and/or processing by the management system 150 and/or the machine learning model 512. The process may determine coordinates of the first ROI 646 in the image data 642, which are used to identify the first ROI 646 in the compressed image data 644. Similarly, the processes may determine coordinates of the second ROI 648 in the image data 642, which are used to identify the second ROI 648 in the compressed image data 644. The ROI coordinates from the low resolution video are scaled to the high resolution video.

Meanwhile, the compressed image data 644 shows the first ROI 646 and the second ROI 648 after compression. The first ROI 646 may be detected as a head or face of the user 602, which is desired to be obfuscated to conceal an identity of the user. Accordingly, during processing, the first ROI 646 is reduced in quality to a second quality 652 which removes identifying details of the face of the user 602, thereby obfuscating an identity of the user. For example, the processing may remove or reassign pixels or otherwise blur the image to compress this portion of the image while obfuscating the first ROI in the compressed image data 644.

The second ROI 648 may be identified as a hand of the user 602. The second ROI 648 may have its coordinates scaled to the high resolution video to identify the second ROI 648 in the high resolution video, which may be preserved as high quality imagery 654 that is of a greater quality than the low quality imagery 650 of the second ROI 648 in the image data 642. Other portions of the user 602 may be defined as regions of disinterest (or "ROD") 656 via analysis of the image data 642. The ROD coordinates are scaled to the high resolution video to identify the ROD 656 in the high resolution video. The ROD 656 of the high resolution video may be reduced in quality for inclusion in the compressed image data 644 by reducing a quality of the high resolution video. Thus, after processing, the ROD 656 may have a lower quality than the second ROI 648 that includes the high quality imagery 654.

Figure 7:
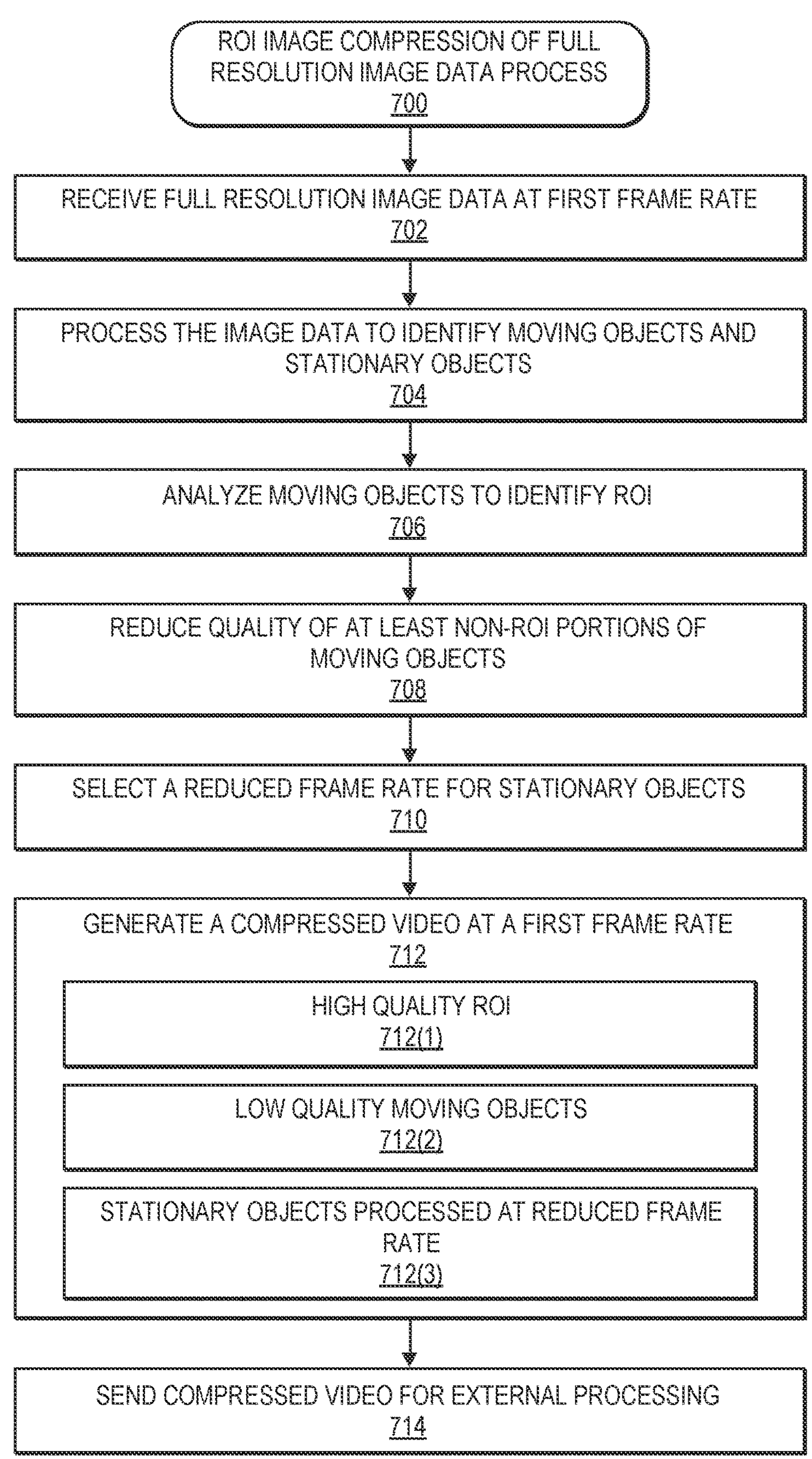
FIG. 7 is a flow diagram of an example process for compressing video by identifying an ROI in imagery, according to an implementation.

FIG. 7 is a flow diagram of an example process 700 for compressing video by identifying an ROI in imagery, according to an implementation. The example process of FIG. 7 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation and any number of the described operations can be combined in any order and/or in parallel to implement the routine. Likewise, one or more of the operations may be considered optional. Various operations from different processes may be combined in accordance with various embodiments.

The process 700 may begin by receiving high resolution image data from an image capture device or indirectly from an intermediary device, as in 702. For example, a camera may output a single source of image data, which may be received by the management system 150 for processing. The image data may be recorded at a relatively high resolution to enable recognition of at least some text or markings on items, such as a product name, a brand, a unique identifier, a visual code, or other information. This information may enable a determination of the exact item, such as using data from the item data store 504.

In accordance with various embodiments, the image data may be processed to identify moving objects and stationary objects in the image data, as in 704. For example, the image data may be analyzed to determine groups of pixel locations that change values between frames, which may be designated as moving objects, or otherwise referred to as moving pixels or moving regions. Similarly, the image data may be analyzed to determine groups of pixel locations that do not change or move between frames, which may be designated as stationary objects or otherwise referred to as stationary pixels or stationary regions. In some embodiments, a vision module or vision algorithm may be used to identify the moving objects and the stationary objects using the techniques described above, and possibly other techniques including edge detection, motion estimation, trajectory prediction, and so forth. For example, a moving object may be identified at least partially by an edge detection process. In some embodiments the moving objects may be tracked to determine trajectory and motion direction across multiple frames, thereby enabling predictive movement of the moving objects. Dense Inverse Search (DIS) optical flow algorithms may be used for motion estimation. In some instances, pre-processing may be used to remove noise from the background (stationary objects) using temporal filtering while using the moving objects location information to preserve motion without causing motion artifacts.

The moving objects portion of the image data may be analyzed to identify one or more ROI, as in 706. In some instances, portions of the stationary objects may also be analyzed to identify one or more ROI. In various embodiments, the moving objects or other image data may be analyzed to determine ROIs using the machine learning model 512. The ROIs may be detected using edge detection algorithms to determine which pixels belong to the object included in the ROI. In some instances, the ROI may include a portion of an object, such as a hand of a person, a label of an item, and so forth. In accordance with some embodiments, the machine learning model 512 may perform human segmentation to determine humans or portions of humans (e.g., hands, faces, bodies, arms, etc.) within the moving objects and/or the image data. The machine learning model 512 may also perform object segmentation (or object identification) to determine items (e.g., identify specific items, etc.) within the moving objects and/or image data. The machine learning model 512 may be used to detect users/items, create bounding boxes or other boundaries or borders around at least portions of the users/items to define pixels or regions, and/or to label the users/items with descriptors and/or other information for association with the users/items.

Portions of the moving objects that are not designated as an ROI, may be designated as non-ROI portions, or otherwise referred to as regions of disinterest. The management system 150 may reduce the quality of at least the non-ROI portions of the moving objects, as in 708. The reduction in quality results in compressed imagery having a smaller file size, thereby requiring less bandwidth to send the compressed imagery and/or less storage space to store the compressed imagery. The resulting quality of the non-ROI portions may be a low quality.

In various embodiments, the reduced frame rate may be selected for the stationary objects, as in 710. For example, the image data may have a first frame rate, such as a frame rate of at least 15 frames per second. The reduced frame rate (or second frame rate) may be fewer frames per second, as compared to the first frame rate, such as one frame for every 15 frames at the first frame rate (one frame per second) or less (e.g., one frame per two seconds, etc.). In the example where the second frame rate is one frame per second, the stationary objects would be depicted using the same frame fifteen times when encoded at 15 frames per second before changing to a new frame on the sixteenth frame (after one second). However other frame rates may be used as the first frame rate and the second frame rate. In some embodiments, the frame rates may be selected based on a target compression size, an amount of network bandwidth, amount of storage space, and/or other metrics. In some embodiments, the frame rate of the stationary object may be modified over time, such as in response to a number of ROIs tracked in the frame, a number of pixels allocated for the ROIs, or based on other considerations.

The management system 150 may generate compressed image data at the first frame rate, as in 712. For example, an encoder may be used to assemble or otherwise create compressed image data based on the processing as described above, such as by compositing portions of imagery processed in the operations described above. The compressed image data may include high quality ROI image data, as in 712(1). The compressed image data may include low quality non-ROI image data, as in 712(2). The compressed image data may also include the stationary objects data processed at a second frame rate that is lower than the first frame rate, as in 712(3). The stationary objects may be maintained at the high quality or may also be reduced in quality depending on a compression target or on other factors. Since the stationary objects are not refreshed as often as the ROI and non-ROI image data, the quality may have less of an impact on the overall size of the compressed image data. The encoder may encode the image data to create compressed image data using a standardized format to enable playback of the compressed image data using existing software.

The resulting compressed image data may be sent to the external source 514 or another location for additional processing, as in 714. For example, the compressed data may be sent to an external source and viewed by a user or processed by another device or software for various reasons such as to determine an item obtained by a user or otherwise interacted with by a user. In some instances, the compressed data may be sent to the external source for storage.

Figure 8:
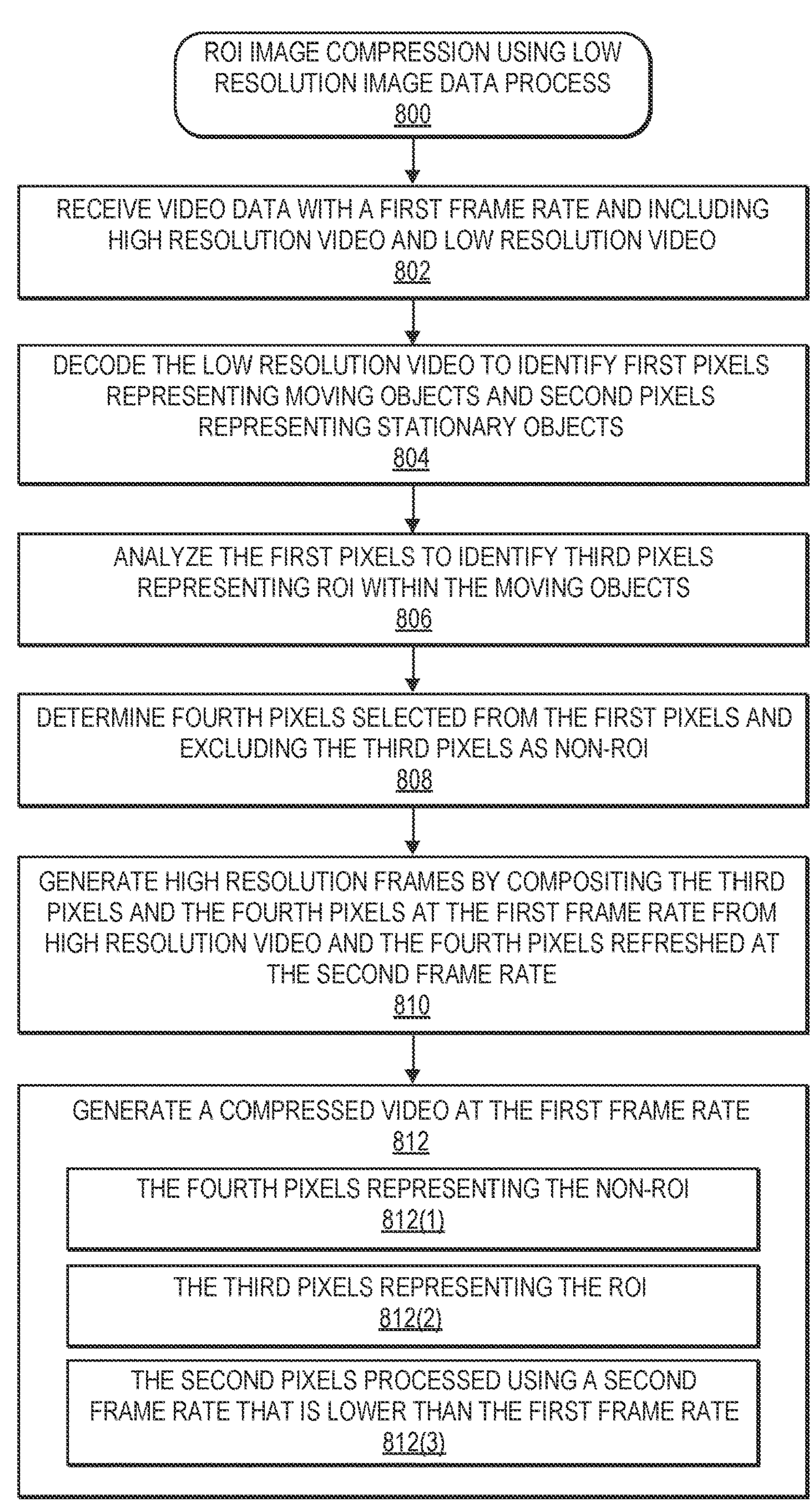
FIG. 8 is a flow diagram of another example process for compressing video by identifying an ROI in imagery, according to an implementation.

FIG. 8 is a flow diagram of another example process 800 for compressing video by tracking an ROI in imagery, according to an implementation. The process 800 may begin by receiving low resolution image data and corresponding high resolution image data from an image capture device or indirectly from an intermediary device, as in 802. Thus, the process may include two or more instances of image data that may show the same imagery, but may be encoded at different qualities (e.g., high resolution, low resolution, etc.). The image data may have a first frame rate, such as 15 frames per second or another frame rate. For example, a camera may output multiple sources of image data (low resolution and high resolution), which may be received by the management system 150 for processing. The high resolution image data may enable recognition of at least some text or markings on items, such as a product name, a brand, a unique identifier, or other information.

The low resolution image data may be decoded to identify first pixels representing moving objects and second pixels representing stationary objects, as in 804. As used herein, the term "first pixels" refers to a first group of pixels that may or may not be contiguous. For example, the low resolution image data may be analyzed to determine pixels (e.g., pixel locations) that change (or move) between frames, which may be designated as the first pixels (moving objects). Similarly, the low resolution image data may be analyzed to determine pixels that do not change (or move) between frames, which may be designated as second pixels (stationary objects). In some embodiments, a vision module or vision algorithm may be used to identify the first pixels and/or the second pixels. The first pixels and/or the second pixels may be identified at least partially by edge detection processes. In some embodiments the first pixels may be tracked to determine trajectory and motion direction across multiple frames, thereby enabling predictive movement of the pixels or groups of pixels. In accordance with some embodiments, the second pixels may be processed at a second frame rate that is lower than the first frame rate, such as to provide a frame at least once per second (or less frequently, such as one frame for every two seconds, etc.).

The first pixels of the image data may be analyzed to identify third pixels representing one or more ROI, as in 806. The third pixels may be a subset of the first pixels that include the ROI. In some instances, portions of the second pixels may also be analyzed to identify one or more ROI. In various embodiments, the first pixels or other image data may be analyzed to determine ROIs using the machine learning model 512. The ROIs may be detected using edge detection algorithms to determine which pixels belong to the object included in the ROI. In some instances, the ROI may include a portion of an object, such as a hand of a person, a label of an item, and so forth. In accordance with some embodiments, the machine learning model 512 may perform human segmentation to determine humans or portions of humans (e.g., hands, faces, bodies, arms, etc.) within the moving objects and/or the image data. The machine learning model 512 may also perform object segmentation (or object identification) to determine items (e.g., identify specific items, etc.) within the moving objects and/or image data. The machine learning model 512 may be used to detect users/items, create bounding boxes or other boundaries or borders around the users/items to define pixels or groups of pixels (or regions), and/or to label the users/items with descriptors and/or other information for association with the users/items.

In various embodiments, fourth pixels may be designated as a subset of the first pixels excluding the third pixels (from the ROIs) to indicate non-ROI image data, as in 808. The non-ROI image data may also be referred to as ROD image data. However, the non-ROI pixels may be detected by other means, such as classification of objects as non-ROI objects and so forth.

High resolution frames may be generated by compositing the third pixels and the fourth pixels at a first frame rate from the high resolution video and the fourth pixels refreshed at the second frame rate, as in 810. As an example, a hand of a user may be identified as an ROI. The third pixels may include the pixels of the hand and may include at least some pixels beyond the hand, but within a boundary or bounding shape/box. This portion of image data may be desirable to be encoded in a high quality to enable detection of an item interacted with by the hand of the user. Thus, the hand may be encoded using the third pixels from the high quality image data to provide greater quality of the ROI.

An encoder may generate compressed image data at the first frame rate, as in 812. For example, the encoder may be used to assemble or otherwise create compressed image data based on the processing as described above. The compressed image data may include the non-ROI image data of the fourth pixels compressed to a low quality, as in 812(1). The compressed image data may include high quality ROI image data of the third pixels in a high quality, as in 812(2). The compressed image data may also include the stationary objects data of the second pixels processed at a second frame rate that is lower than the first frame rate, as in 812(3). The stationary objects may be maintained at the high quality or may also be reduced in quality depending on a compression target or on other factors. The encoder may encode the compressed image data using a standardized format to enable playback of the compressed image data using existing software.

Figure 9:
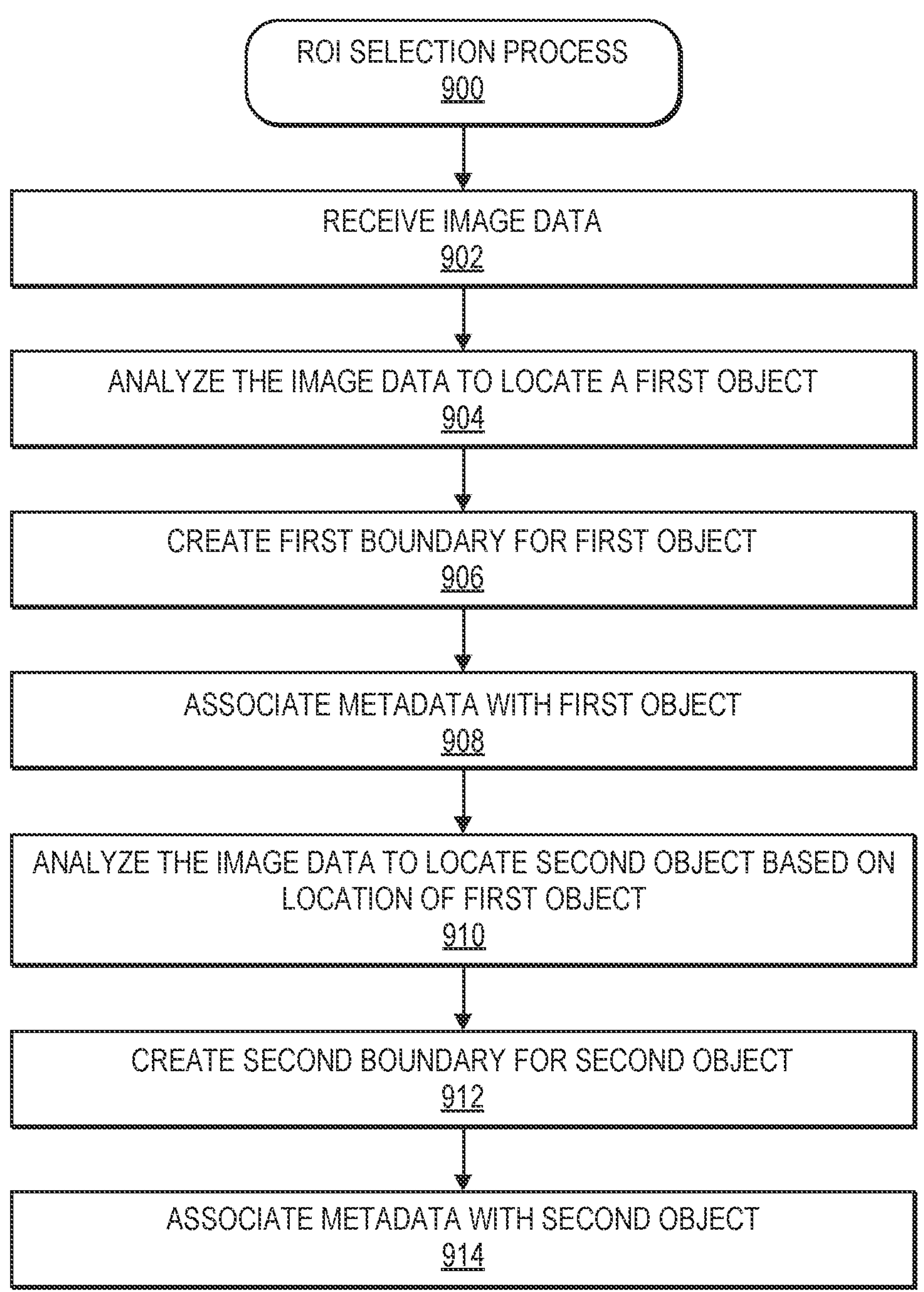
FIG. 9 is a flow diagram of an example process for identifying and selecting ROIs in an image, according to an implementation.

FIG. 9 is a flow diagram of an example process 900 for identifying and selecting ROIs in an image, according to an implementation. The process 900 may begin by receiving image data, as in 902. The image data may be high resolution data or low resolution data corresponding to high resolution data.

The image data may be analyzed to locate a first object, as in 904. For example, the machine learning model 512 may use object recognition algorithms to detect an object of interest (e.g., a first ROI), such as a hand of a person or another object determined to be of interest.

In accordance with some embodiments, a first boundary or bounding box may be determined for the first object to enclose or otherwise define associated pixels (or a region) as representing the object, as in 906. The first boundary may be an edge of the object, such as an edge detected by edge detection algorithms. However, the first boundary may include additional pixels beyond the first boundary to create a buffer zone of pixels beyond the pixels that represent the first object. The buffer zone may be used for various purposes. For example, the buffer zone may indicate pixels that belong to other adjacent items. The buffer zone may capture pixels of the object that would otherwise be excluded by the edge detection algorithms or object detection algorithms.

The first object may be associated with metadata, as in 908. The metadata may include description information, a time stamp (e.g., a time when the object was first detected, etc.), a name, a unique identifier, a price of an item, a quantity of the item, and/or other data. The metadata may be obtained from the item data store 504, the user data store 506, the facility data store 508 and/or the inventory data store 510.

The image data may be analyzed to locate a second object, as in 910. The second object (e.g., or second ROI) may be located based on identification of the first object, among other possible information used to locate the second object. In various embodiments, the machine learning model 512 may use object recognition algorithms to detect the second object based on a location of the first object (e.g., the hand of the user). For example, the first object may be the hand of the user that is about to touch or otherwise interact with another object (e.g., an item in the materials handling facility). The second object may be identified due to a proximity to the first object, such as being located adjacent to the first object (or adjacent to the hand) as viewed in the image data. Other associations between the first object and the second object may be available and used for selection of the second object.

In some embodiments, the second object may be identified by looking ahead at subsequent frames to determine an action (e.g., hand touching item, etc.) and then applying that knowledge (e.g., location information or object information) to prior frames in determination and designation of the second object (e.g., item that is going to be touched). By using this "look ahead" feature, the second ROI may be identified and preserved at a high quality in one or more prior frames before it is manipulated, which may allow better identification of the second ROI (e.g., determine object, read code, read text, etc.), such as before a hand covers part of the object. This may be possible when data is not processed in real-time, but is processed with a delay, such as in near real-time or in delayed processing to create the compressed image data.

In accordance with some embodiments, a second boundary or bounding box may be determined for the second object to enclose or otherwise define associated pixels (or a region) as representing the second object, as in 912. The second boundary may be an edge of the object, such as an edge detected by edge detection algorithms. However, the second boundary may include additional pixels beyond the second boundary to create a buffer zone of pixels beyond the pixels that represent the second object. The second boundary May include pixels that are separate from pixels included in the first boundary, thus the first boundary and the second boundary may not overlap.

The second object may be associated with metadata, as in 914. The metadata may include description information, a time stamp (e.g., a time when the object was first detected, etc.), a name, a unique identifier, a price of an item, a quantity of the item, and/or other data. The metadata may be obtained from the item data store 504, the user data store 506, the facility data store 508 and/or the inventory data store 510.

Figure 10:
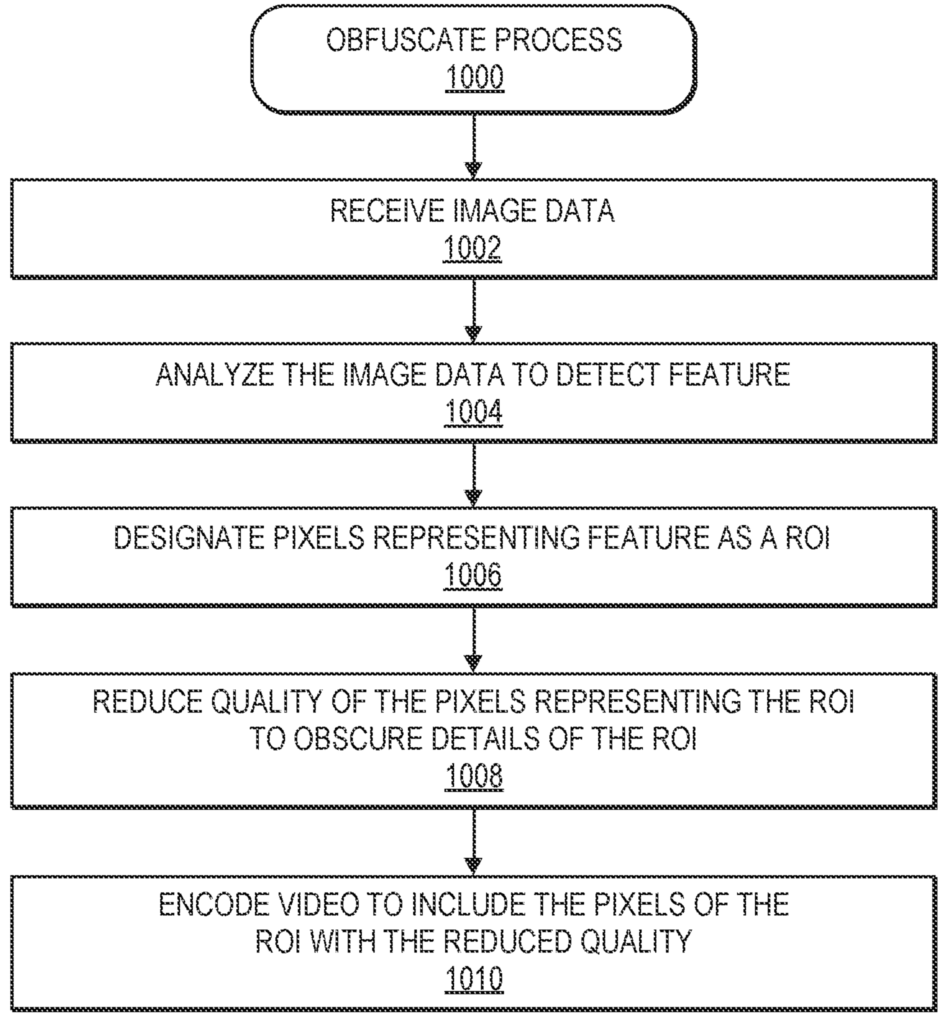
FIG. 10 is a flow diagram of an example process for selectively obfuscating an ROI, according to an implementation.

FIG. 10 is a flow diagram of an example process 1000 for selectively obfuscating an ROI, according to an implementation. The process 1000 may begin by receiving image data, as in 1002. The image data may be high resolution data or low resolution data corresponding to high resolution data.

The image data may be analyzed to detect a feature, as in 1004. For example, the image data may be analyzed using the techniques discussed above (e.g., the machine learning model 512, the object detection algorithms, edge detection algorithms, etc.) to detect a person (e.g., a face of a person).

In accordance with some embodiments, the pixels that represent the detected feature (e.g., the face) may be identified as an ROI, as in 1006. A boundary or bounding box may be determined for the ROI to enclose or otherwise define associated pixels (or a region) as representing the ROI. The boundary may be an edge of the object, such as an edge detected by edge detection algorithms. However, the first boundary may include additional pixels beyond the first boundary to create a buffer zone of pixels beyond the pixels that represent the first object.

Based on the feature and rules for compression, privacy, or other rules, the particular ROI (e.g., a face of a person) may be designated for obfuscation. The obfuscation may prevent determination of an identity of the person while allowing greater compression of the image data. The process 1000 may reduce a quality of the pixels representing the particular ROI, as in 1008. While some ROIs may be preserved at a high quality as discussed above, some ROI (such as a face of a person, proprietary information, identification cards, payment cards, etc.) are obfuscated by reducing a quality to make identification or legibility of other items, such as alphanumeric characters, difficult or impossible. The particular ROI may be reduced in quality by any factor or technique to make detection or identification difficult or impossible.

The encoder may encode compressed image data to include the pixels of the ROI with the reduced quality, as in 1010. By encoding the compressed image data in this manner, details about the ROI may be concealed while allowing a viewer to generally understand context in the compressed image data. For example, a viewer of the compressed image data may still be able to determine that the image includes a face of a person, a payment card, or other concealed object, but may not be able to identify the exact person (e.g., by name, etc.) or may not be able to read numbers on the payment card, for example. The compressed image data including the obfuscated ROI may further reduce a size of the image data during compression thereby achieving two objectives (i.e., reduced size, conceal sensitive imagery) with this process.

Figure 11:
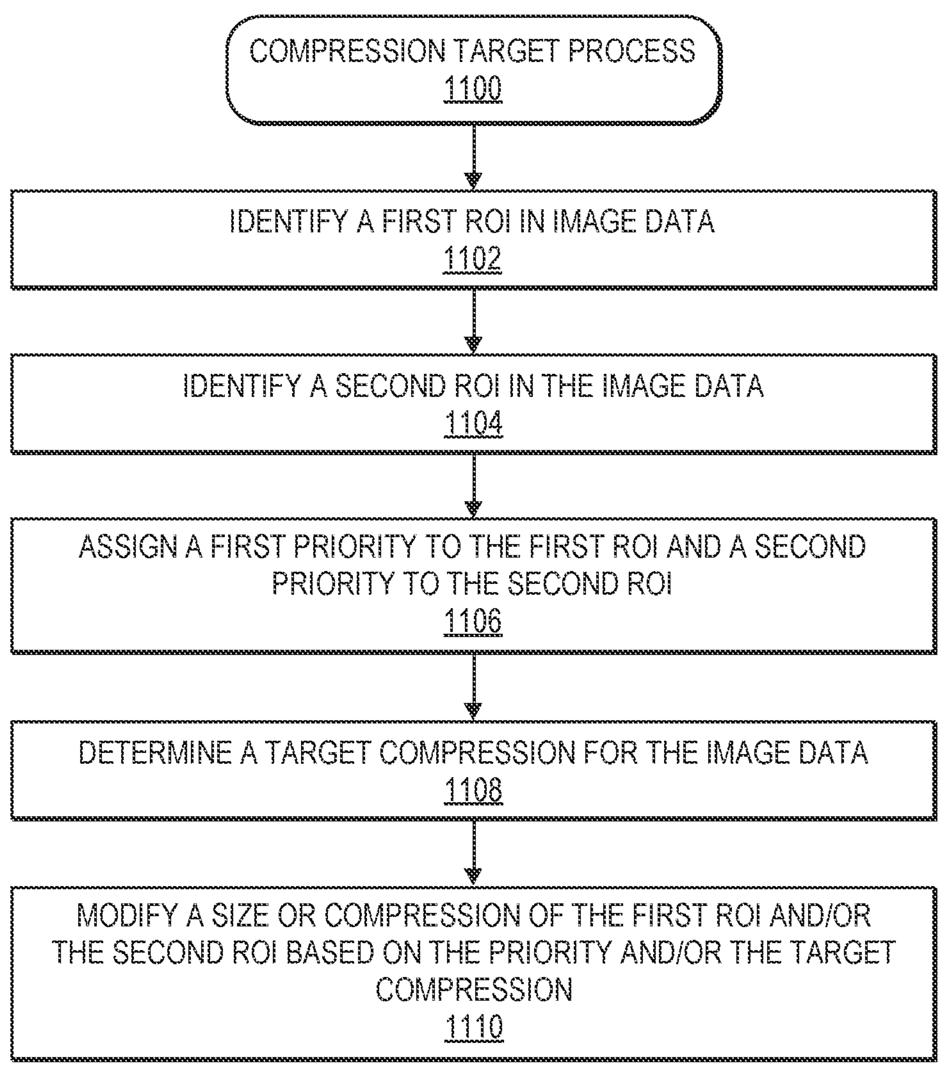
FIG. 11 is a flow diagram of an example process for managing compression attributes, according to an implementation.

FIG. 11 is a flow diagram of an example process 1100 for managing compression attributes, according to an implementation. The process begins by identifying a first ROI in imagery, as in 1102. In some embodiments, a machine learning model may be used to identify an object or portion of an object in video imagery (e.g., a frame of video) as an ROI. As an example, the imagery may include a person and the first ROI may be identified as a hand of the person. However, the first ROI may be selected from other objects, including items, other portions of a person, a cart, and so forth.

In accordance with various embodiments, a second ROI may be identified in the imagery, as in 1104. The second ROI may be identified at a same time or a different time as the first ROI, as a result of identifying the first ROI, or independent from identifying the first ROI. The second ROI may be a portion of another person (e.g., hand, etc.), a different object, and so forth.

The management system 150 or the machine learning model 512 may assign a first priority to the first ROI and a second priority to the second ROI, as in 1106. The priority may be a score, value, or other designation that indicates a relative importance of the ROI in relation to another ROI. The priority may be used for various purposes, such as to prioritize tracking of the ROI, prioritize higher quality for the ROI, determine a boundary for the ROI, prioritize detection or related ROIs with the ROI (e.g., as discussed in the process 900, etc.), or used in other ways.

In some embodiments, a target compression value may be determined for the image data, as in 1108. For example, the management system may determine an amount to compress the size of the image data, such as to enable storage or data transmission at a predetermined metric.

The management system may modify a boundary (e.g., size) and/or compression (e.g., change in quality) of the first ROI and/or the second ROI based on the priority from 1106 and/or the target compression from 1108, as in 1110. For example, the first ROI may have a higher priority and may include a larger boundary that includes a larger buffer between the boundary and an edge of the detected object (e.g., hand, etc.) of the first ROI as compared to a second ROI. This larger boundary may enable detection of other associated ROIs as discussed above. In some embodiments, the first ROI may be preserved at a highest quality while the second ROI, having the lower priority, may be compressed to a lower quality while still having higher quality than other moving objects or content detected in the imagery. In this way, the image may be compressed to achieve the target compression determined at 1108 while tracking multiple ROIs.

Figure 12:
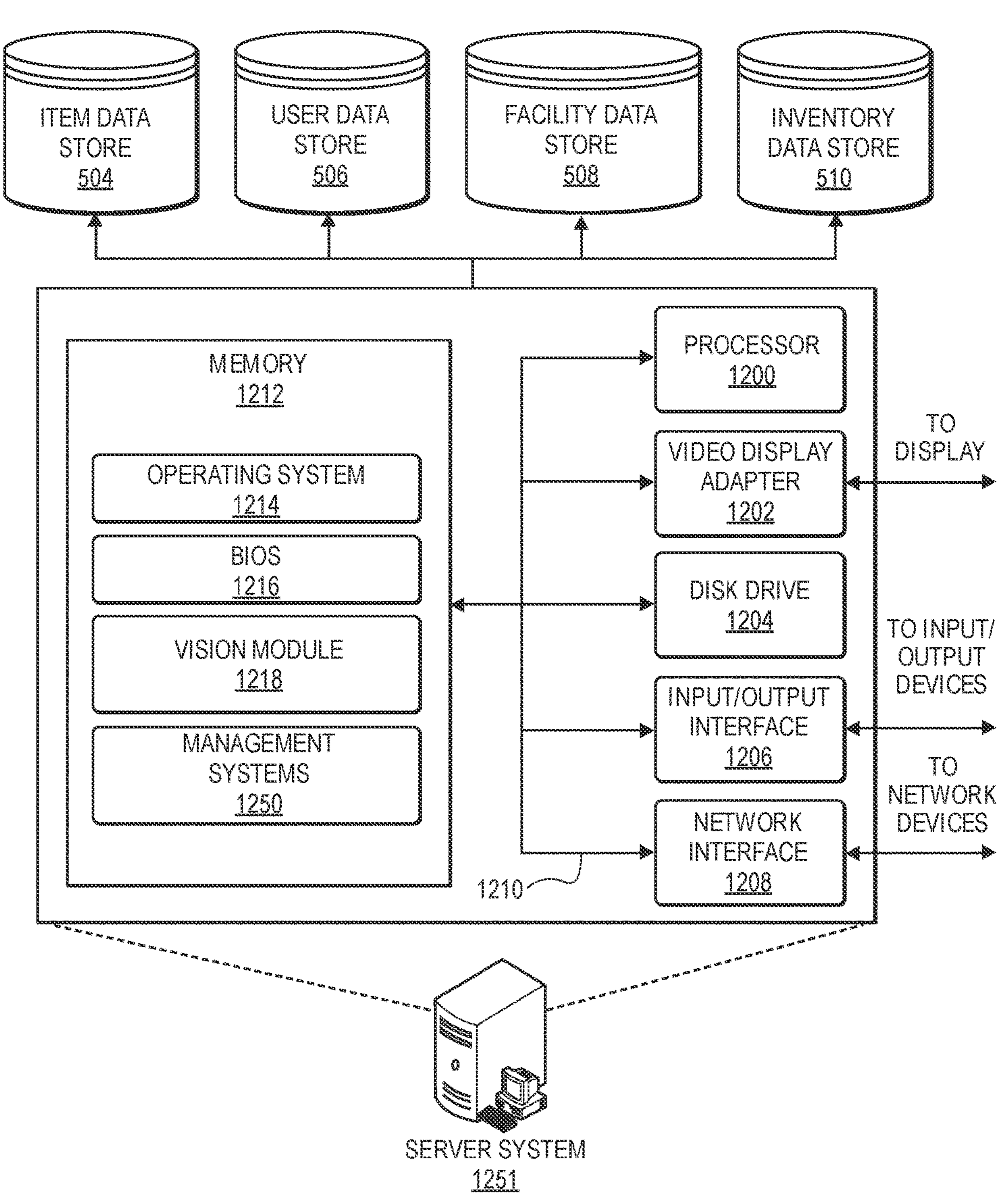
FIG. 12 is a block diagram of an illustrative implementation of a server system that may be used with various implementations.

FIG. 12 is a pictorial diagram of an illustrative implementation of a server system 1251, such as the computing resource(s) 250 that may be used in the implementations described herein. The server system illustrated in FIG. 12 or another similar server system may be configured to operate the management system 150, for example.

The server system 1251 may include a processor 1200, such as one or more redundant processors, a video display adapter 1202, a disk drive 1204, an input/output interface 1206, a network interface 1208, and a memory 1212. The processor 1200, the video display adapter 1202, the disk drive 1204, the input/output interface 1206, the network interface 1208 and the memory 1212 may be communicatively coupled to each other by a communication bus 1210.

The video display adapter 1202 provides display signals to a local display permitting an operator of the server system 1251 to monitor and configure operation of the server system 1251. The input/output interface 1206 likewise communicates with external input/output devices not shown in FIG. 12, such as a mouse, keyboard, scanner, or other input and output devices that can be operated by an operator of the server system 1251. The network interface 1208 includes hardware, software, or any combination thereof, to communicate with other computing devices. For example, the network interface 1208 may be configured to provide communications between the server system 1251 and other computing devices via the network 302, as shown in FIG. 3.

The memory 1212 may be a non-transitory computer readable storage medium configured to store executable instructions accessible by the processor(s) 1200. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1208.

In one implementation, the I/O interface 1206 may be configured to coordinate I/O traffic between the processor(s) 1200, the memory 1212, and any peripheral devices, the network interface 1208 or other peripheral interfaces, such as input/output devices. In some implementations, the I/O interface 1206 may perform any necessary protocol, timing or other data transformations to convert data signals from one component (e.g., non-transitory computer readable storage medium) into a format suitable for use by another component (e.g., processor(s) 1200). In some implementations, the I/O interface 1206 may include support for devices attached through various types of peripheral buses, such as a variant of the Peripheral Component Interconnect (PCI) bus standard or the Universal Serial Bus (USB) standard, for example. In some implementations, the function of the I/O interface 1206 may be split into two or more separate components, such as a north bridge and a south bridge, for example. Additionally, in some implementations, some or all of the functionality of the I/O interface 1206, such as an interface to the memory 1212, may be incorporated directly into the processor(s) 1200. The memory 1212 is shown storing an operating system 1214 for controlling the operation of the server system 1251. A binary input/output system (BIOS) 1216 for controlling the low-level operation of the server system 1251 is also stored in the memory 1212.

The memory 1212 additionally stores computer executable instructions, that, when executed by the processor 1200 cause the processor to perform one or more of the processes discussed herein. In various embodiments, the memory 1212 may store a vision module 1218. The vision module 1218 (or vision algorithm) may be used to identify the moving objects and the stationary objects, as discussed above. A moving object may be identified at least partially by edge detection processes performed by the vision module 1218, for example. The vision module 1218 may also be used to identify candidates for an ROI, possibly with input from a machine learning model, such as the machine learning model 512 shown in FIG. 5. In some embodiments, the vision module 1218 may estimate a motion and/or trajectory of a moving object, which may be used to inform location of the object in subsequent frames, for example.

The memory 1212 additionally stores program code and data for providing compression of imagery via management systems 1250. The management systems 1250 may facilitate data exchange between the data stores 504, 506, 508, 510 and/or other data stores. The management systems 1250 may include some or all of the functionality described above for the management system 150.

As used herein, the term "data store" refers to any device or combination of devices capable of storing, accessing, and retrieving data which may include any combination and number of data servers, databases, data storage devices and data storage media in any standard, distributed or clustered environment. The server system 1251 can include any appropriate hardware and software for integrating with the data stores 504, 506, 508, 510 as needed to execute aspects of the management systems 1250.

The data stores 504, 506, 508, 510 can include several separate data tables, databases or other data storage mechanisms and media for storing data relating to a particular aspect. For example, the data stores 504, 506, 508, 510 illustrated include mechanisms for maintaining item information, user information, facility information, inventory information, and possibly descriptor information (e.g., positions, ROI shapes, etc.), etc. Depending on the configuration and use of the server system 1251, one or more of the data stores may not be included or accessible to the server system 1251 and/or other data stores may be included or accessible.

It should be understood that there can be many other aspects that may be stored in the data stores 504, 506, 508, 510. The data stores 504, 506, 508, 510 are operable, through logic associated therewith, to receive instructions from the server system 1251 and obtain, update, or otherwise process data in response thereto.

The memory 1212 may also include the management systems 1250, as discussed above (e.g., the management system 150). The corresponding server system 1251 may be executable by the processor 1200 to implement one or more of the functions of the server system 1251. In one implementation, the server system 1251 may represent instructions embodied in one or more software programs stored in the memory 1212. In another implementation, the server system 1251 can represent hardware, software instructions, or a combination thereof.

The server system 1251, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 12. Thus, the depiction in FIG. 12 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:

a video camera having an overhead field of view of a surface within a materials handling facility;

one or more processors; and a memory storing program instructions that when executed by the one or more processors cause the one or more processors to at least:

receive video data from the video camera, the video data having a first frame rate and including a high resolution video and a low resolution video of the surface within the materials handling facility;

decode the low resolution video to identify first pixels representing moving objects and second pixels representing stationary objects;

process the second pixels in the high resolution video at a second frame rate that is lower than the first frame rate;

analyze the first pixels representing the moving objects to identify:

third pixels representing regions of interest (ROI) within the moving objects, the ROI including at least hands of a person; and fourth pixels selected from the first pixels and excluding the third pixels, the fourth pixels representing regions of disinterest (ROD) within the moving objects;

generate high resolution frames by compositing the third pixels and the fourth pixels at the first frame rate from the high resolution video and the fourth pixels refreshed at the second frame rate;

encode the high resolution frames to create compressed video at the first frame rate that includes:

the fourth pixels representing the ROD compressed to a low quality;

the third pixels representing the ROI with a high quality; and the second pixels processed at the second frame rate; and send the compressed video from the materials handling facility to an external site for analysis of the ROI in context of the ROD and the stationary objects.

2. The system of claim 1, wherein the program instructions that when executed by the one or more processors further cause the one or more processors to at least:

analyze the first pixels representing the moving objects to detect fifth pixels representing a face of a person; and encode the fifth pixels at a lower quality to obfuscate the face.

3. The system of claim 1, wherein the second frame rate includes one new frame no more frequently than per one second.

4. The system of claim 1, wherein the third pixels representing the ROI within the moving objects includes a first ROI of the hands of the person and a second ROI of an object adjacent to the hands.

5. The system of claim 1, wherein the program instructions that when executed by the one or more processors further cause the one or more processors to at least:

determine a compression target for the encoding; and wherein the third pixels are selected based at least in part on the compression target for the encoding.

6. A method, comprising:

receiving image data including at least a high resolution video and a low resolution video at a first frame rate from one or more image capture devices located within a materials handling facility;

processing the low resolution video to identify at least a first region as including moving objects and at least a second region as including stationary objects;

processing the at least the second region at a second frame rate that is lower than the first frame rate;

analyzing the at least the first region to identify:

at least one region of interest (ROI) within the moving objects, the at least one ROI including at least one of a portion of a person or an object; and a region of disinterest (ROD), the ROD including remaining imagery in the first region while excluding the at least one ROI;

generating high resolution frames by compositing the at least one ROI and the ROD at the first frame rate from the high resolution video and the at least the second region refreshed at the second frame rate; and encoding a compressed video at a high resolution at the first frame rate that includes:

the at least one ROI with a high quality;

the ROD compressed to a low quality; and the at least the second region processed at a second frame rate that is lower than the first frame rate.

7. The method of claim 6, further comprising:

detecting a third region within the first region that includes a face of a person;

reducing a quality of the third region to obfuscate an identity of the person; and wherein the generating the compressed video further includes the third region at the first frame rate while having the quality reduced.

8. The method of claim 6, wherein the at least one ROI includes a first ROI and a second ROI, the method further comprising:

identifying the first ROI in the first region; and identifying the second ROI in the first region, the second ROI being distinct from the first ROI.

9. The method of claim 8, wherein the second ROI is identified based at least in part on a location of the first ROI.

10. The method of claim 8, wherein:

the first ROI is a hand of the person; and the second ROI is an object adjacent to the hand of the person.

11. The method of claim 8, further comprising:

determining a target compression for the compressed video based at least in part on network attributes associated with the materials handling facility;

selecting a first size of a first boundary for the first ROI; and selecting a second size of a second boundary for the second ROI based at least in part on the first size of the first boundary and the target compression for the compressed video.

12. The method of claim 6, further comprising:

selecting the second frame rate to include one frame for at least every one second.

13. The method of claim 6, further comprising:

generating a boundary to define the at least one ROI; and associating metadata with the at least one ROI, the metadata including at least one of a description, a name, or a time.

14. The method of claim 6, further comprising:

tracking the at least one ROI over a plurality of frames included in the image data, wherein the tracking includes performing motion estimation.

15. A computer-implemented method, comprising:

receiving image data including at least a high resolution video and a low resolution video at a first frame rate from the one or more image capture devices;

processing the low resolution video to identify first pixels as including moving objects and second pixels as including stationary objects;

processing the second pixels at a second frame rate that is lower than the first frame rate;

identifying, from the first pixels, a region of interest (ROI), the ROI depicting at least one of a portion of a person or an object;

designating, from the first pixels, third pixels that exclude the ROI; and generating high resolution frames by compositing the ROI and the third pixels at the first frame rate from the high resolution video and the second pixels refreshed at the second frame rate;

generating a compressed video at a high resolution at the first frame rate that includes:

the ROI maintaining a high quality;

the third pixels compressed to a low quality; and the second pixels processed at the second frame rate.

16. The computer-implemented method of claim 15, wherein:

identification of the ROI is performed, at least in part, using a deep neural network configured to locate predetermined objects based at least in part on feature recognition.

17. The computer-implemented method of claim 15, wherein:

identification of at least the first pixels is performed using a vision algorithm configured to detect changes in values at corresponding pixel locations between successive frames of the image data.

18. The computer-implemented method of claim 15, further comprising:

selecting, at a first time, the second frame rate based at least in part on a target compression rate for the compressed video;

determining, at a second time, that the ROI is no longer included in a field of view depicted in the image data; and modifying, at or after the second time, the second frame rate to increase a refresh rate of the second pixels.

19. The computer-implemented method of claim 15, further comprising:

selecting the low quality based at least in part on a target compression for the compressed video; and reducing a quality of the third pixels from the high quality to the low quality.

20. The computer-implemented method of claim 15, further comprising:

tracking the ROI over a plurality of frames included in the image data.

* * * * *